US007975239B2

(12) United States Patent
Bellotti et al.

(10) Patent No.: US 7,975,239 B2
(45) Date of Patent: Jul. 5, 2011

(54) SYSTEM AND METHOD FOR PROVIDING METADATA INTERACTION AND VISUALIZATION WITH TASK-RELATED OBJECTS

(75) Inventors: Victoria Bellotti, San Francisco, CA (US); Daniel G. Bobrow, Palo Alto, CA (US); Ian E. Smith, Seattle, WA (US); Nicolas B. Ducheneaut, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1135 days.

(21) Appl. No.: 10/738,597

(22) Filed: Dec. 17, 2003

(65) Prior Publication Data

US 2005/0138631 A1    Jun. 23, 2005

(51) Int. Cl.
*G06F 3/048* (2006.01)
*G06F 3/00* (2006.01)
(52) U.S. Cl. ........ 715/825; 715/739; 715/763; 715/765; 715/767; 715/810
(58) Field of Classification Search .......... 715/762–764, 715/744, 788, 748, 765, 739, 767, 810, 825; 707/10, 3, 104.1; 709/206
See application file for complete search history.

(56) References Cited

U.S. PATENT DOCUMENTS

| | | | | |
|---|---|---|---|---|
| 5,862,325 | A * | 1/1999 | Reed et al. | 709/201 |
| 5,864,848 | A * | 1/1999 | Horvitz et al. | 707/6 |
| 6,425,002 | B1 * | 7/2002 | Zurcher et al. | 709/223 |
| 6,961,720 | B1 * | 11/2005 | Nelken | 706/47 |
| 7,089,287 | B2 * | 8/2006 | Bellotti et al. | 709/206 |
| 7,139,800 | B2 * | 11/2006 | Bellotti et al. | 709/206 |
| 7,216,121 | B2 * | 5/2007 | Bachman et al. | 707/3 |
| 2002/0138582 | A1 * | 9/2002 | Chandra et al. | 709/206 |
| 2003/0081011 | A1 * | 5/2003 | Sheldon et al. | 345/838 |
| 2003/0126136 | A1 * | 7/2003 | Omoigui | 707/10 |
| 2003/0135558 | A1 * | 7/2003 | Bellotti et al. | 709/206 |
| 2004/0073615 | A1 * | 4/2004 | Darling | 709/206 |

OTHER PUBLICATIONS

Takkinen J. et al., "Café: A Conceptual Model for Managing Information in Electronic Mail," Laboratory for Intelligent Information Systems (IISLAB), IEEE Proceedings of the Hawai'i International Conference on Systems Sciences, Jan. 6-7, 1998, Kona, Hawaii, USA.
Fisher D. et al., "Studies of Automated Collection of Email Records," Sep. 21, 2001.
Gwizdka J., "Reinventing the Inbox—Supporting the Management of Pending Tasks in Email,", Comuter-Human Interaction (CHI), Apr. 20-25, 2002, ACM Press, Minneapolis, MN, USA.
Venolia G. D. et al., "Supporting Email Workflow," MSR Tech Report MSR-TR-2001-88, 2001, http://research.microsoft.com/~ginav/.
Rohall S. L. et al., "Email Visualization to Aid Communications," IEEE Symposium on Information Visualization, 2001.

* cited by examiner

*Primary Examiner* — Weilun Lo
*Assistant Examiner* — Nicholas Augustine
(74) *Attorney, Agent, or Firm* — Patrick J. S. Inouye; Scott E. Smith

(57) ABSTRACT

A system and method for providing metadata interaction and visualization with task-related objects is described. A plurality of task-oriented items is defined. Each task-oriented item includes a storage component specifying metadata relating to at least one of planning, executing or completing a task. A visualization is provided to tie in the task-oriented items and associate modeling logic operating on at least one such task-oriented item. The visualization is displayed by highlighting at least one of interdependencies and conflicts between the metadata of the task-oriented items.

33 Claims, 36 Drawing Sheets
(7 of 36 Drawing Sheet(s) Filed in Color)

| Sent | Subject / Title / Link | Due | Pay To: | Amount |
|---|---|---|---|---|
| 04-23-03 | http://www.frogmarchshoes.com | 05-10-03 | Sharon Black | $300.05 |
| 04-27-03 | Bulk order discount rate | 06-01-03 | Joe Bloe | $5342.00 |
| 04-29-03 | Travel expenses | 06-01-03 | Sally Mander | $453.09 |
| 05-01-03 | Your order has been filled | 06-08-03 | Joe K. Name | $648.47 |
| TOTAL | | | | $6743.61 |

SYSTEM AND METHOD FOR PROVIDING METADATA INTERACTION AND VISUALIZATION WITH TASK-RELATED OBJECTS

FIELD

This application relates in general to metadata visualization and, in particular, to a system and method for providing metadata interaction and visualization with task-related objects, including "To-Do" objects in an activity context.

BACKGROUND

In the abstract, task management focuses on the process relating to what, how, when and by whom a task is planned, executed and completed. In concrete terms, this facet of task management is analogous to task definition, message exchange, events and reminders, and actionable parties and contacts. Through a view of a "To-Do" list in context, task management also helps to organize, prioritize and monitor a set of tasks that make up a work activity for an individual. Each of these facets can be supported through various means through the use of task management applications; the second are related to managing issues of interactions among different tasks.

Providing efficient, automated task management is important. In particular, users are now able to collaborate and interact on a global basis more easily than ever before, in large part due to recent advances in mobile computing and wide area data communication. Presently, geographically separated and mobile users are able to freely exchange messages over connected and wireless networks irrespective of location or time through the use of mobile computing platforms, including pen-based tablet personal computers, personal digital assistants and integrated mobile devices. The devices provide suitable platforms with which to model and manage tasks and task sets, such as sets of To-Do list items.

The ease of communicating globally has greatly increased user expectations in nearly every area of automation, including automated task management. Electronic mail, or simply, "email," is one example of how communications have evolved with user expectations. Historically, email contained only plain text and was available at little or no cost through a wide spectrum of conventionally connected "wired" devices. Advances in bandwidth and computational power allowed larger and more elaborate forms of messages and email evolved from plain text to formatted multimedia-capable information that could include attached documents and hyperlinks to external sources. Similarly, the Worldwide Web, or simply, "Web," has become the medium of choice to provide low cost and widely circulated information dissemination.

To some degree, email has begun to merge with task management as a natural extension of the communications process. Tasks are often communicated through email and the "In" Box in which a user stores email frequently becomes the central hub around which a task is managed. Unfortunately, email clients generally provide a poor surrogate for effective task management.

Email clients belong to a genre of vertically-aligned office management applications that include word processing, spreadsheet, slide preparation, and similar applications, which perform a single, core function. As a result, email clients primarily facilitate the composition, exchange and storage of email, with limited collaborative capabilities. Some email clients, such as Outlook, licensed by Microsoft Corporation, Redmond, Calif., include additional functionality for tracking activities, events, contacts, and similar tightly-scoped data. Task management only applications offer similar functions. However, these functions are only loosely integrated and lack underlying logic to create a coherent activity-based framework that can assist a user in taking action relative to a task.

Moreover, email clients and task management only applications generally store the activities, events, contacts, and similar data as static objects. Each item is treated as a storage container that merely records data. Operational logic inherent in the application can operate on the data to generate, for instance, a reminder to perform a scheduled activity. However, these applications lack logic associated through an external framework to model the tasks and provide triggers to generate additional actions by discovering inferences and relationships between the items.

Finally, email clients and task management only applications visualize the activities, events, contacts, and similar data as static objects along a single dimension relative to the core aspect of the item being visualized. For instance, activities are visualized in an event-centric manner using a "To-Do" list view. Events are visualized in an event-centric manner using a day, week or month calendar view. Contacts are visualized in a contacts-centric manner using a contacts database view. Due to such unipolar perspectives, these applications fail to identify interdependencies or conflicts between items, particularly with respect to different types of items, such as activities and events, which can both implicate deadlines.

Therefore, there is a need for an approach to providing a framework facilitating dynamic task management through logic modeling interdependencies and conflicts between individual task-oriented items. Preferably, such an approach would accommodate managing ad hoc collections of activities, events, contacts, and similar data through user selectable task modeling paradigms.

There is a further need for an approach to providing visualization of metadata representing the interdependencies and conflicts discovered by a dynamic task management environment. Preferably, such an approach would present integrated visualizations of disparate task-oriented items and would highlight the interdependencies and conflicts through visual or other means.

SUMMARY

One embodiment provides a system and method for providing dynamic interaction with task-oriented items in a task management framework. At least one template is defined and includes a visualization interface and one or more user interactive components. Modeling logic is associated with at least one such user interactive component and operates on at least one task-oriented item. The at least one template is instantiated and the modeling logic is executed responsive to a selection of the user interactive component.

A further embodiment provides a system and method for providing metadata interaction and visualization with task-related objects. A plurality of task-oriented items is defined. Each task-oriented item includes a storage component specifying metadata relating to at least one of planning, executing or completing a task. A visualization is provided to tie in the task-oriented items and associate modeling logic operating on at least one such task-oriented item. The visualization is displayed by highlighting at least one of interdependencies and conflicts between the metadata of the task-oriented items.

Still other embodiments will become readily apparent to those skilled in the art from the following detailed description, wherein are described embodiments by way of illustrating the best mode contemplated for carrying out the teachings. As will be realized, other and different embodiments are possible and the various details are capable of modifications in various obvious respects, all without departing from the spirit and the scope. Accordingly, the drawings and detailed description are to be regarded as illustrative in nature and not as restrictive.

BRIEF DESCRIPTION OF THE DRAWINGS

The patent or application file contains at least one drawing executed in color. Copies of this patent or patent application publication with the color drawings will be provided by the Office upon request and payment of the necessary fee.

FIG. 31 is a screen display showing, by way of example, calendar reminder bars as visualized by the routine of FIG. 30.

FIG. 35 is a screen display showing, by way of example, an integrated calendar as visualized by the routine of FIG. 34.

FIG. 37 is a screen display showing, by way of example, a spreadsheet as visualized by the routine of FIG. 36.

DETAILED DESCRIPTION

System Overview

Figure 1:
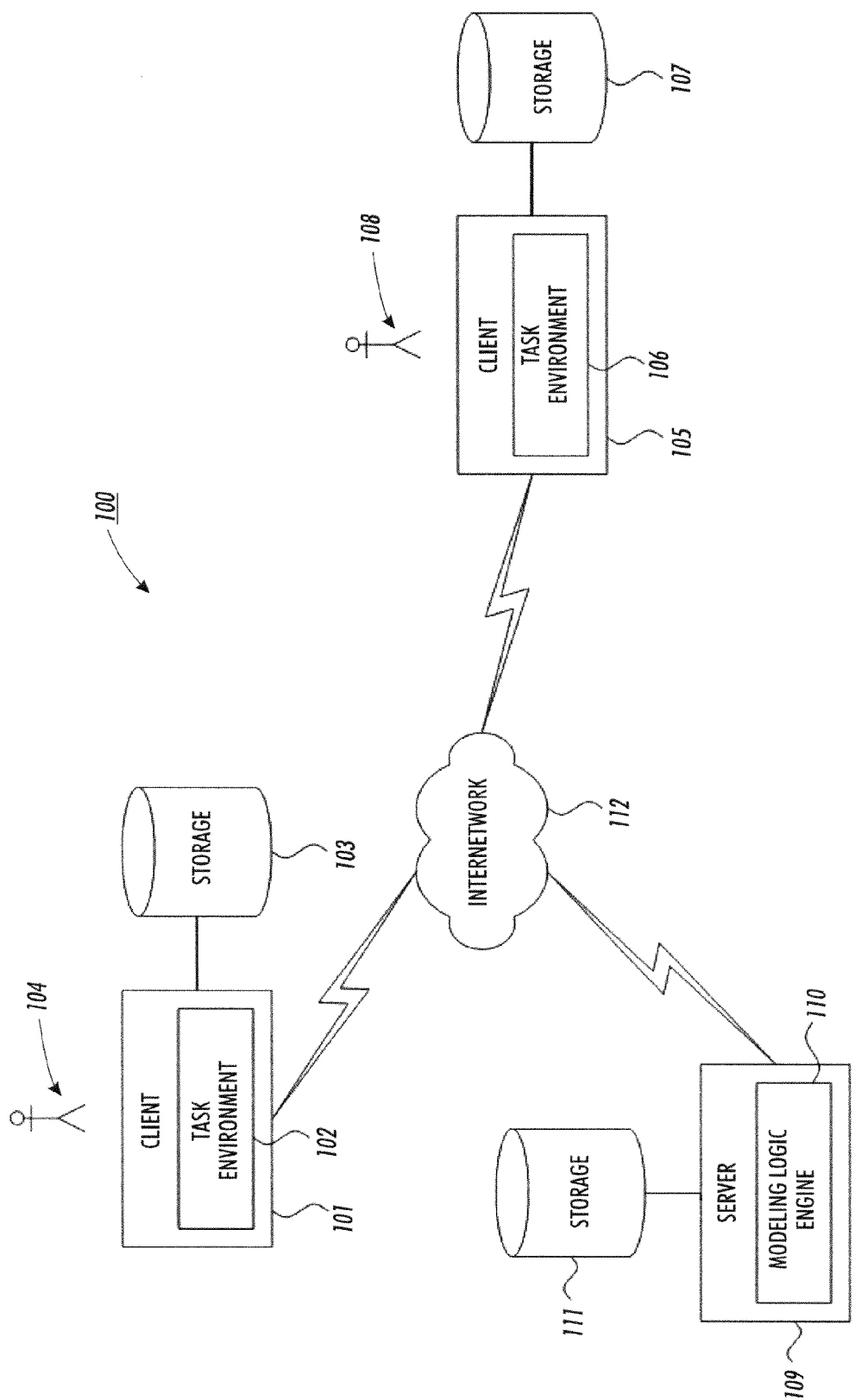
FIG. 1 is a block diagram showing a system for providing metadata interaction and visualization with task-related objects, in accordance with an embodiment.

FIG. 1 is a block diagram showing a system for providing metadata interaction and visualization 100 with task-related objects, in accordance with an embodiment. One or more client systems 101, 105 execute a task environment 102, 106 and can exchange messages in the form of email or other modalities. Each client system 101, 105 is operated by a user 104, 108. The task environments enable the users 104, 108 to interact with and visualize task objects, activities, events, contacts and other data, as further described below with reference to FIG. 2. Each client system 101, 105 includes a storage device 103, 107 to persistently store data.

In addition, a server system 109 executes a modeling logic engine 110, which operates as a back end inference engine to each task environment 102, 106. The server system 109 also includes a storage device 111 to persistently store data. The client systems 101, 105 communicatively interface with the server system 109 preferably via a network medium, such as an internetwork 114, including the Internet, or other communications medium. In addition, the functionality of each client system 101, 105 and the server system 109 could be combined on a single system or distributed over a set of tightly- or loosely-coupled processors.

Briefly, each task environment 102, 106 provides access to and visualization of task-related objects, including task objects, activities, events, contacts and other data. Task objects are collections of items, which include email, activities, events, contacts and other data, as well as other task objects. Task objects are manipulated through a task viewer that executes modeling logic associated with each task object and item. Email, activities, events, and contacts can be manipulated through an email client, activity manager, event manager, and contacts manager, as well as through the task viewer. Within the task viewer, however, the email, activities, events, and contacts are generally accessed within the context of a specific task object instance.

The individual computer systems, including the client systems 101, 105, and server system 109, include general purpose, programmed digital computing devices including a central processing unit (CPU), random access memory (RAM), non-volatile secondary storage, such as a hard drive or CD ROM drive, network or wireless interfaces, and peripheral devices, including user interfacing means, such as a keyboard, display, and pointing device. Program code, including software programs, and data is loaded into the RAM for execution and processing by the CPU and results are generated for display, output, transmittal, or storage.

Task Environment Software Modules

Figure 2:
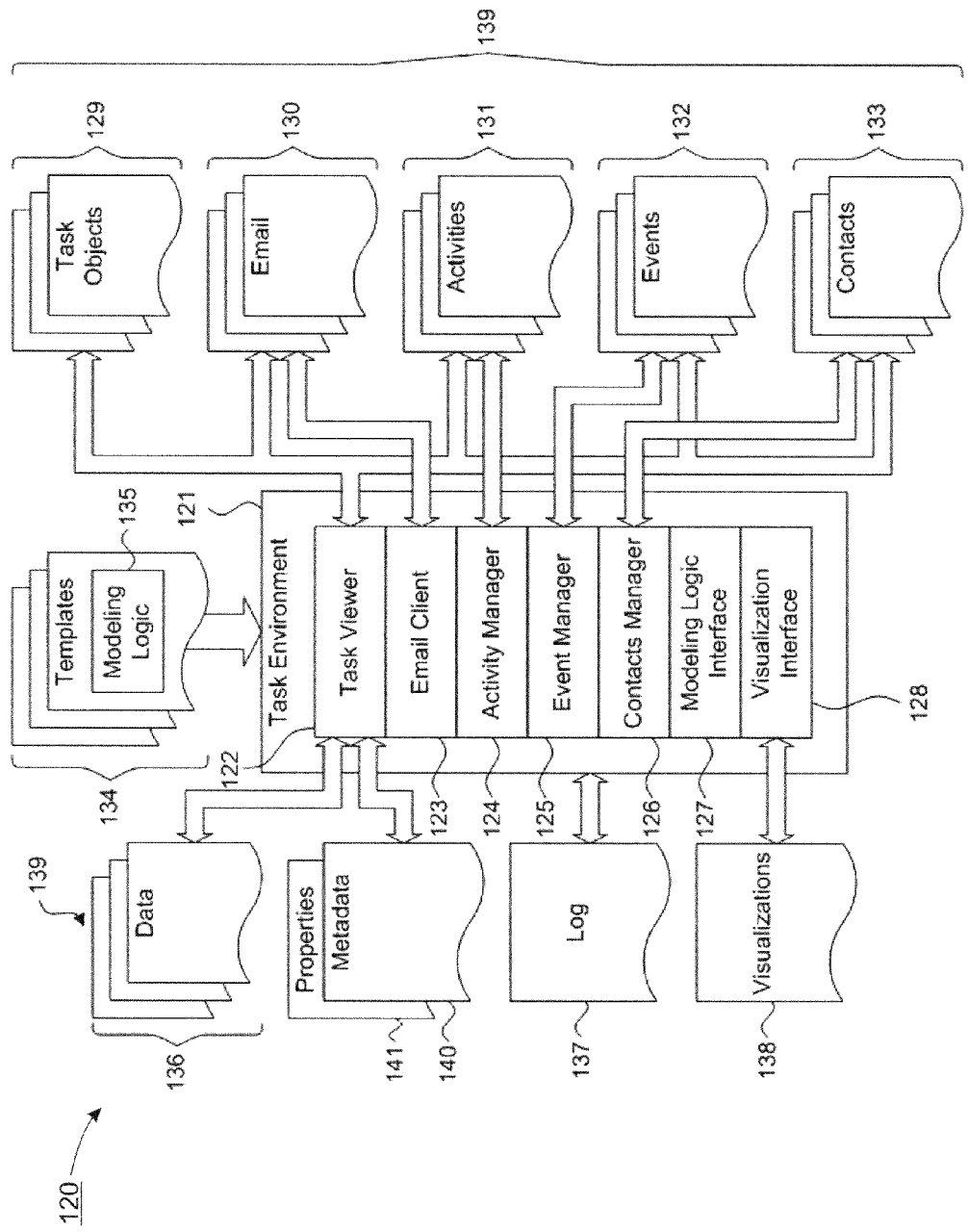
FIG. 2 is a functional block diagram showing software modules for use by a task environment, such as used in the system of FIG. 1.

FIG. 2 is a functional block diagram 120 showing software modules for use by a task environment 121, such as used in the system of FIG. 1. The task environment 121 logically groups task-oriented applications used to access and manipulate task-oriented items 139. A task-oriented item 139 is a storage component relating to the planning, execution or completion of a task and can include task objects 129, email 130, activities 131, events 132, and contacts 133, as further described below with reference to FIG. 3. Other types of task-oriented items 139 are possible. The task environment 121 also integrates data generated by other applications, such as slide presentation or word processing applications. Finally, the task viewer 122 can record user interactions in a log 137 for accountability and tracking purposes. The task objects 129, email 130, activities 131, events 132, contacts 133, data 136, and log 137 are persistently stored in a storage device (not shown).

The task environment 121 includes a task viewer 122, email client 123, activity manager 124, event manager 125, contacts manager 126, modeling logic interface 127, and visualization interface 128. The email client 123 operates on email 130. The activity manager 124 operates on activities 131. The event manager 125 operates on events 132. The contacts manager 126 operates on contacts 133. Each of the email client 123, activity manager 124, event manager 125, and contacts manager 126 provide conventional functionality for respectively creating, modifying, archiving, exchanging, and deleting email, activities, events and contacts.

The task viewer 122 deduces, stores and attaches metadata 140 to task objects 139, as well as email 130, activities 131, events 132, contacts 133, data 136, and other task objects 127, in response to interaction with one or more icons defined in a task management interface instance, as further described below with reference to FIG. 4. Briefly, the metadata 140 is stored within the task environment 121 by the task viewer 122. The task viewer 122 models tasks being managed by the user through templates 135, which include modeling logic 135 defining procedural operations that are triggered by a user dragging or otherwise interacting with an icon; or other user apparent indication of the expected form of the metadata. The modeling logic 135 models expectations inherent in the nature of the task and affecting how data is processed. The modeling logic 135 does not incorporate assumptions about an item dragged onto the icon and instead attempts to mine the data necessary to meet the expectations from the item. The user confirms that the data identified by the modeling logic 135 is relevant, which is then added to the task environment 121 as metadata 140.

The task-oriented items 139 belonging to a particular task are stored into the task environment 121 by linking or indexing into a task object 129. In a further embodiment, the task-oriented items 139 can continue to be stored in conventional file system storage, such as within a user's environment within an application. The task viewer 122 indexes these items 139 and provides an alternative means to access and interact with the items 139. The task viewer 122 uses the metadata 140 that the environment has attached to the items 139 to support reasoning over and interaction with the items 139 through modeling logic 135 associated with a template 134 from which the task management interface has been instantiated. For instance, metadata 140 about the date of an event 132 extracted from or attached to an email 130 allows the task viewer 122 to reason that airline tickets should be bought by a specific date before that event 132. Similarly, the metadata 140 about a contact 133 extracted from an email 130 allows the task viewer 122 to retrieve any record of that contact 133 from the user's standard contacts database, to list that contact 133 in a contacts viewer within the task environment 121 for that specific task, and to find all tasks associated with that contact.

The task viewer 122 can either dynamically identify and extract metadata 140 or can offer an interactive mode, whereby the user drags a task-oriented item 139 onto an icon. The task viewer 122 then opens item 139 and the user can select the information to be associated with the icon as metadata 140. In a further embodiment, the task viewer 122 can also copy the metadata 140 to a contacts store (not shown) also maintained in the task environment 121. In a still further embodiment, the task viewer 122 can update the user's standard contact database.

The modeling logic interface 127 logically interfaces the task environment 121 to the modeling logic engine 110, particularly with respect to the task viewer 122. The modeling logic engine 110 functions as a back end inference engine to modeling logic 135 included in templates 134, as further described below beginning with reference to FIG. 7 et seq. Finally, the visualization interface 128 logically interfaces each of the task viewer 122, email client 123, activity manager 124, event manager 125, contacts manager 126 to visualizations 138, which can be provided integral to each application or as adjunct modeling logic through the task environment 121, as further described below beginning with reference to FIG. 26 et seq.

Each task object 129 is a set of task-oriented items 139, which can contain email 130, activities 131, events 132, contacts 133, and data 136, as well as other task objects 129. Task objects 129 allow a user to assemble a set of task-oriented items 139 into a single view using a task management interface. The view is customizable through one or more templates 134, which define the appearance and layout of the task management interface to model user selectable paradigms. Each template 135 includes modeling logic 135 that is automatically executed, such as by the modeling logic engine 110, responsive to manipulation of the task-oriented items 139 within the task management interface. The task-oriented items 139 are logically associated through the task viewer 122, as further described below with reference to FIG. 6.

Email 130 are finite communications exchanged between one or more users. Each email 130 can include a sender, one or more recipients, including copied and blind-copied recipients, subject, body, and one or more attachments. Email 130 is composed and exchanged through a conventional or other types of email client 123, such as those available in Outlook, licensed by Microsoft Corporation, Redmond, Wash. Other forms of email and email content are possible.

Activities 131 are undertakings or work assigned to one or more users. Each activity 131 can include one or more responsible parties, subject, due date, and priority. Activities 131 are composed and tracked through a conventional or other types of activity manager 124, such as the Tasks feature of Outlook, licensed by Microsoft Corporation, Redmond, Wash. Other forms of activities and activities content are possible. For example, recurrent events may be represented.

Events 132 are occurrences or activities set to occur over a fixed or open duration with possible starting and ending dates. Each event 132 can include one or more responsible parties, subject, location, starting date and time, ending date and time, and priority. Events 132 are scheduled and tracked through a conventional or other types of event manager 125, such as the Calendar feature of Outlook, licensed by Microsoft Corporation, Redmond, Wash. Other forms of events and events content are possible.

Contacts 133 are records that contain information useful in communicating with one or people or entities. Each contact 133 can include a name, company, physical addresses, telephone numbers, email addresses, Web site, and similar information. Contacts 133 are maintained through a conventional or other types of contacts manager 126, such as the Contacts feature of Outlook, licensed by Microsoft Corporation, Redmond, Wash. Other forms of contacts and contacts content are possible.

Each task-oriented item, including task objects 129, email 130, activities 131, events 132, contacts 133, and data 136, can include metadata 140 and properties 141. Metadata 140 represents explicit information that is extrinsic to the content of the item, whereas properties 141 include implicit qualities of an item that may not be explicitly represented. Metadata 140 and properties 141 are related but separate concepts. For example, complexity could be a property 141 of a document item, but may not be represented as metadata 140 associated with that document item. Metadata 140 can be assigned directly or indirectly to each item and includes the following:

Actionable: Assigns one or more actors responsible for participating in the progress or completion of a task-oriented item. The actor can be the user, one or more unspecified users or email recipients, or a specific named person, group or entity. An actor can be selected from a global contacts or other list.

Contacts: Assigns contacts to a task-oriented item 139 automatically acquired by dint of listed senders and recipients. Task-oriented items 139 acquire contacts selected from all senders and recipients of the contents, information extracted from the message content, and any other form of identifiable task-oriented item.

Starting Date: Sets a starting date to a task-oriented item 139 and, optionally, defers the task-oriented item 139 to a future starting date. In the described embodiment, the starting date is preferably specified in a dialog box or pop-up date selector, which may optionally include a time of day.

Termination: Sets an ending date to a task-oriented item. In the described embodiment, the termination is preferably specified in a dialog box or pop-up date selector.

Deadline: Sets a deadline specifying when a task-oriented item 139 must be completed, usually occurring before the completion date. In the described embodiment, the deadline is preferably specified in a dialog box or pop-up date selector.

Reminder: Sets a reminder for a task-oriented item, including a date, time and reminder type, such as email, pop-up dialog or other visual or audio cue. In the described embodiment, the reminder is preferably specified in a dialog box or pop-up date selector.

Note: Adds a note to a task-oriented item 139 provided as freeform text.

Outline Form: Adds an outline form to a task-oriented item.

Send: Specifies an email address for a task-oriented item.

Telephone Call: Specifies a telephone number for a task-oriented item.

Billable: Adds a billable amount that reflects billable activities to a task-oriented item. In the described embodiment, the billable amount is preferably specified in a dialog box.

Budget: Adds a budget amount that reflects budget-related activities to a task-oriented item. In the described embodiment, the budget amount is preferably specified in a dialog box.

Event: While task-oriented items 139 can have associated start dates and deadlines, an event can be added to a task-oriented item 139 as metadata 140 that implies a specific time and place, such as travel time, location, attendees, and actions.

Conflict: Identifies a date that matches a start date, deadline or event for an existing task-oriented item.

Other types and forms of metadata 140 are possible.

Method Overview

Figure 3:
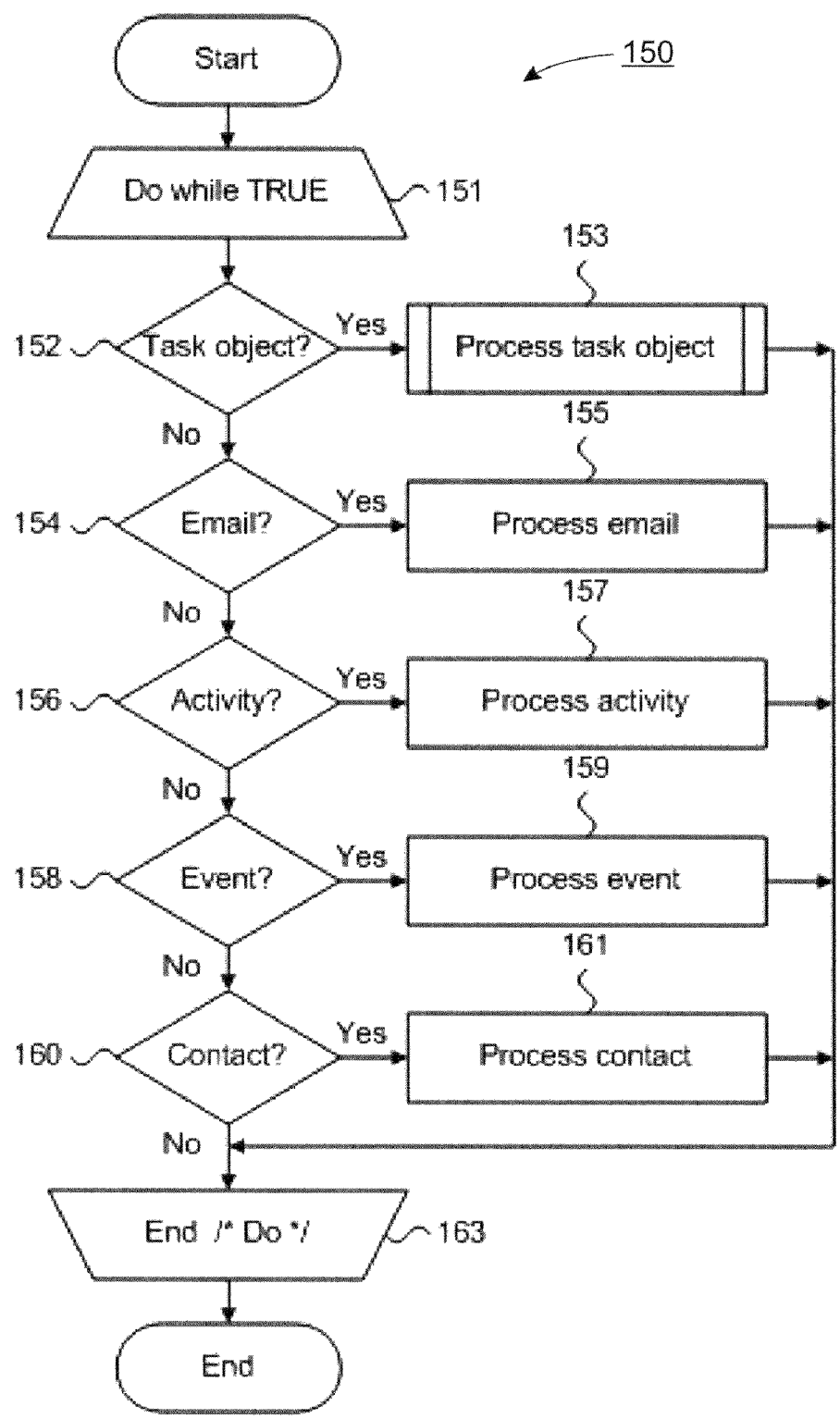
FIG. 3 is a flow diagram showing a method for providing metadata interaction and visualization with task-related objects, in accordance with an embodiment.

FIG. 3 is a flow diagram showing a method for providing metadata 140 interaction and visualization 150 with task-related objects, in accordance with an embodiment. The method provides a logical flow between the various task-oriented processing applications, that is, the task viewer 122, email client 123, activity manager 124, event manager 125, and contacts manager 126, within the task environment 121. Each application manipulates one or more corresponding items and the effects of any changes are logically propagated to other items through the modeling logic 135 and visualization methods, as further described below with reference to FIG. 26 et seq.

The method executes as a continuous processing loop (blocks 151-163) and ends upon the termination of the last application. During each loop iteration (block 151), an application is executed based on the type of item to be processed. Thus, if the item is a task object 129 (block 152), the task object is processed by the task viewer 122 (block 153), as further described below with reference to FIG. 6. If the item is an email 130 (block 154), the email 130 is processed by the email client 123 (block 155). If the item is an activity 131 (block 156), the activity 131 is processed by the activity manager 124 (block 157). If the item is an event 132 (block 158), the event 132 is processed by the event manager 125 (block 159). If the item is a contact 133 (block 160), the contact 133 is processed by the contacts manager 123 (block 161). Processing continues while the user continues to execute one or more of the applications (block 163), after which the routine returns.

Task Management Interface

Figure 4:
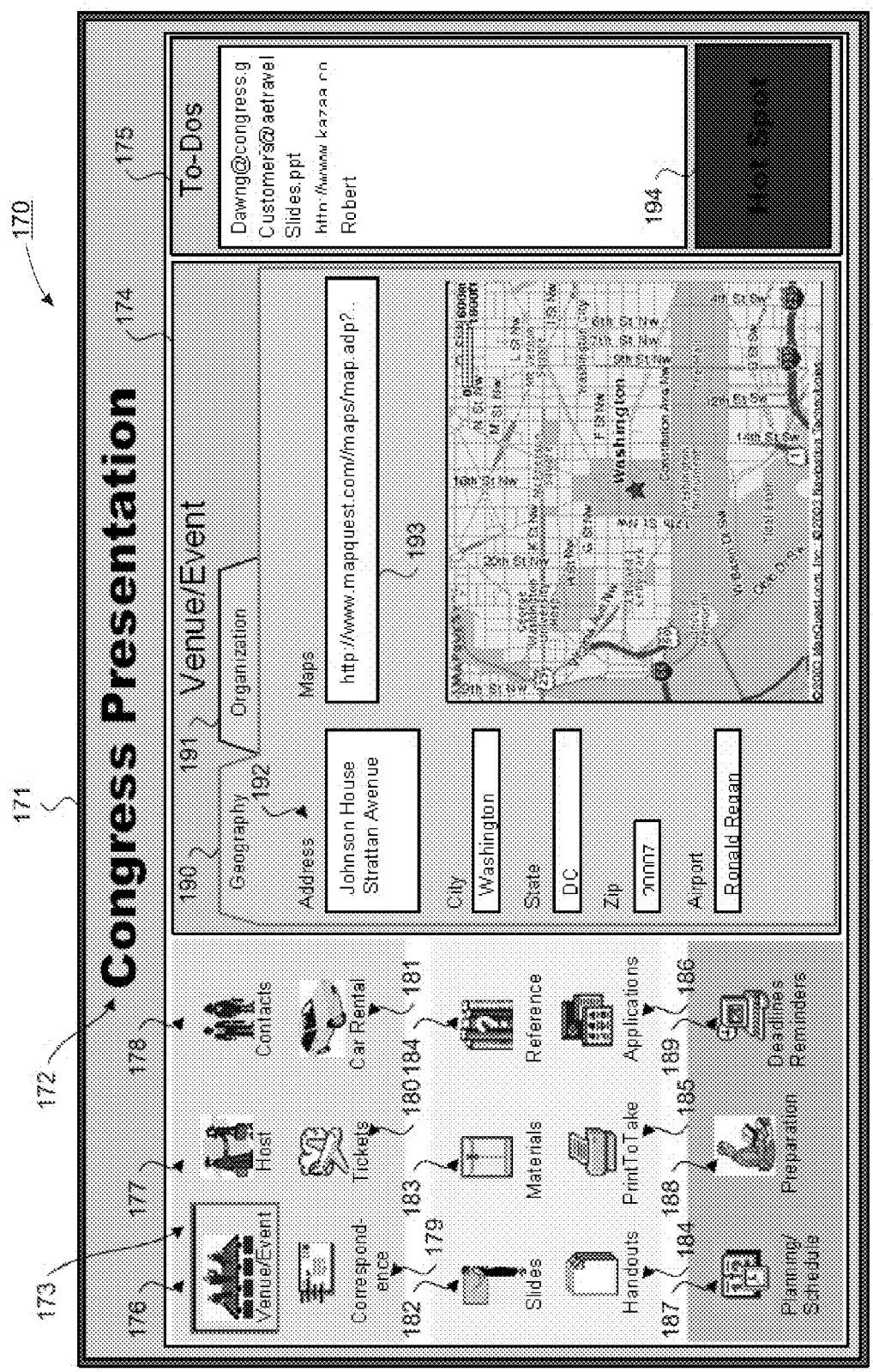
FIG. 4 is a screen display showing, by way of example, a task management interface for use with the task viewer of FIG. 2.

FIG. 4 is a screen display showing, by way of example, a task management interface 170 for use with the task viewer 122 of FIG. 2. The task management interface 170 provides a visual interface logically integrating the functions of the email client 123, activity manager 124, event manager 125, and contacts manager 126 within the context of managing a task object 129. The task management interface 170 is a logical abstraction that provides task-oriented context through one or more templates 134. Each template 134 is instantiated as a specific task management interface instance to a task object 129. The instantiated task management interface provides a visual interface for managing and organizing common or known activities, such as giving a presentation. By way of example, the task management interface 170 is derived from a task template 134 for giving a presentation. The task template 134 is instantiated as a presentation to Congress, which is stored as a presentation task object 172, as further described below with reference to FIG. 7.

Specific instances of templates 134 are closely tied to, but are not equated with, task objects 129. Task objects 129 are collections of items, which include email 130, activities 131, events 132, contacts 133 and other data 136, as well as other task objects 129. Task management interface instances are organized using specific task objects 129 as a means to group and organize the items within the context of the template 134 and to trigger execution of the modeling logic 135. A task management interface instance can include one or more templates 134 instantiated to task objects 129. For example, a task management interface instance for an academic could include templates 134 for preparing a slide presentation, planning a course curriculum and authoring a journal article.

Each template 134 can be used and customized by a user to create an instance of the task management interface 170. An instantiated template 134 automatically creates at least one task object 129 and generates a visual interface providing a plurality of topically-organized icons 173. The task management interface 170 tags metadata 140 stored with an icon 173 to task-oriented items 139, including task objects 129, email 130, activities 131, events 132, contacts 133 and other data 136, that are dragged over the icon 173. When a task-oriented item 139 is dragged over an icon 173, such as the Venue/Event icon 176, the task management interface 170 looks up and attaches any metadata 140 associated with the icon 173 and provides a visualization 174, such as a set of tabbed data entry screens 190, 191. The user can drag a task-oriented item 139 to any icon 173 to tag the item 139 with task-specific metadata 140 associated with the icon 173, and to process the item in terms of the modeling logic 135 corresponding to the icon, such as extracting and processing certain information, including, for example, email addresses, dates or location names in terms of the modeling logic 135. In addition, an icon 173 can be clicked to open a resource viewer that provides access to the items 139 dragged onto the icon 173 and that provides the functionality associated with that resource, for instance, reminding the user to contact the host or review a travel itinerary, as further described below with reference to FIGS. 5A-5B.

The task management interface 170 also tags metadata 140 stored with multiple selected icons 173 to task-oriented items 139 that are dragged over a hotspot 194. When one or more of the icons 173 are first selected and a task-oriented item 139 is then dragged over the hotspot 194, the task management interface 170 looks up and attaches any metadata 140 associated with each of the selected icons 173 and provides visualizations 174.

Finally, the task management interface 170 can include a To-Do list 175 containing one or more task-oriented items 139 for the presentation task object 172, as further described below with reference to FIGS. 5A-5B. Briefly, each task-oriented item 139 can either be input by the user or automatically generated by the modeling logic 135 based on user input and context. For instance, if the user drags an email 130 onto the Host icon 177, the modeling logic 135 deduces that the venue is, by default, the address of the sender of that email 130. The modeling logic 135 can further deduce that travel needs to be booked and will create a corresponding activity 131 in the To-Do list 175 based on the user living in San Francisco, Calif., and the default venue being in Washington, D.C.

In addition, the task management interface 170 can include a hot spot 171 to which an item can be dragged for tagging with multiple types of metadata 140 at one time by clicking on multiple icons. Other user-interface mechanisms can be used to attach multiple tags to an item. Other forms, compositions and arrangements of task management interfaces 170, visual interfaces, displays, and screens are possible.

The task management interface 170 provides an organizing activity and task-based structure in place of conventional or other types of folders, such as are found in windowing-based graphical user interface environments. The structure can be used for storing and retrieving task-oriented items 139. By selecting an icon 173, a user is presented with one or more associated items. For example, contacts 133 associated with task object 129 created by the task management interface instance can be retrieved by selecting the Contacts icon 178. The contacts 133 can be displayed as visualizations 138.

The task management interface 170 also provides a means for reasoning about the original task-oriented items 139 within a coherent activity-based logical framework and provides a basis for taking action to assist a user. One or more of the icons 173 are associated with task-specific logical encapsulated within the ontological structure of the task template 134 as the modeling logic 135. The task-specific logic operates on data stored for a particular instance of a task management interface 170. Preferably, the modeling logic 135 infers activity-related suggestions and reminders triggered by user actions with the task management interface 170 to aid in task management. For example, attaching a Venue/Event icon 176 to an item can cause the underlying modeling logic 135 to extract any date, location, venue, or other information, or to provide the user with support for extracting such information. The modeling logic 135 associates visual assists, such as presenting a dialog box to allow the user to check the accuracy of the extracted data or to choose between ambiguous alternative encodings. Alternatively, the user can manually enter information, should the modeling logic 134 fail to identify the information automatically.

Once unambiguous information has been extracted, the task management interface 170, though the modeling logic 135, can then suggest likely choices of action. For example, in the case of a presentation activity, the task management interface 170 can propose free times in a calendar for the user to schedule preparation time since the nature of the underlying activity naturally requires preparation time preceding the presentation date. Similarly, once a location has been associated with the presentation activity, such as by tagging a ticket confirmation document with the Tickets icon 180 and thereby providing destination information, the task management interface 170 could suggest a car rental location or Web service to retrieve useful information regarding the selected location. Further, if no preparation time or car rental has been extracted or entered from associated items, the task management interface 170 can remind the user at an appropriate activity-specific interval some time prior to the stored event date. For example, rental cars should ideally be booked one or two weeks in advance of the event. A more detailed example is provided below, beginning with reference to FIG. 7.

To-Do List

Figure 5A:
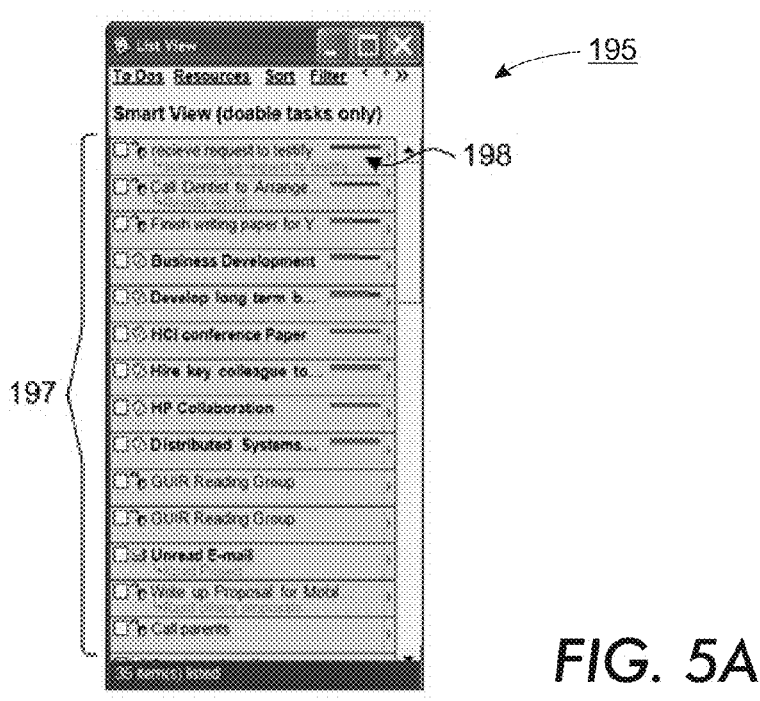
FIGS. 5A-5B are block diagrams showing, by way of example, a To-Do list generated by the task viewer of FIG. 2.
Figure 5B:
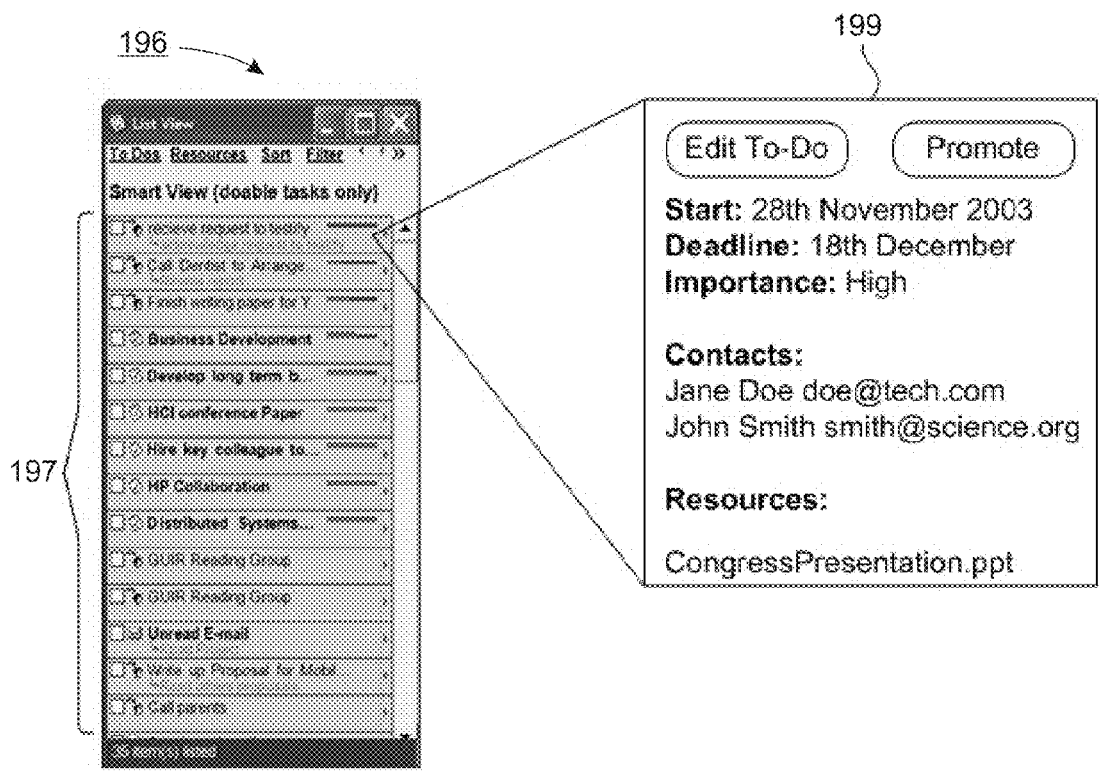

FIGS. 5A-5B are block diagrams 195, 196 showing, by way of example, a To-Do list 197 generated by the task viewer 122 of FIG. 2. Referring first to FIG. 5A, the To-Do list 197 is built within the context of the task management interface instance for a given task and contains one or more task-oriented items 139. The task viewer 122 automatically places items 139 into the list 197 as metadata 140 is deduced from, stored associated with and attached to activity-related items 139, such as activities 131 and events 132.

Items 139 can be organized hierarchically, whereby a whole activity includes one or more possibly nested sub-activities, including task-oriented items 139. Within the To-Do list 197, each item 139 could be a whole activity, as represented by a task object 129, a sub-activity with a larger activity, or an activity unrelated to any other particular activity, but dragged into the list 197 by the user. In addition, non-activity related items 139 could be dragged into the list 197. For instance, email 130 or contacts 133 could be listed. Similarly, data 136, such as a file containing a set of slides, could be dragged into the list 197.

The items 139 within the list 197 could be sorted by project, rather than being presented in a mixed ordering. The items 139 could also be sorted in order of decreasing urgency. The most urgent item 197, that is, the item having the least amount of time remaining until the expiry of the deadline, is at the top of the list 197 and those less urgent items 139 arranged below, with unprioritized items 139 placed at the bottom of the list 197. In a further embodiment, the list 197 can be filtered to only contain, or, alternatively, exclude, items 139 based on a criteria, such as activity, urgency, date ranges, and so forth.

To assist the user with planning, each item 139 in the list 197 can include a reminder bar 198, if applicable, to visually indicate the time remaining prior to a deadline associated with the item 139. In the described embodiment, red indicates time elapsed and green indicates time remaining. Other forms, colors and arrangements of reminder bars 198 are possible.

Referring next to FIG. 5B, the user can click on an item 139 in the To-Do list 197 to launch a resource viewer 199 that presents an information view of the item 139 selected. The resource viewer 199 is a streamlined user interface providing access to the item 139, including any attached metadata 140 and can include an editing feature. The user can set task properties directly, which will update the corresponding data in the original item maintained in the underlying file system, such as by the email client 130. Alternatively, the resource viewer 199 can launch the application associated with the item 139, such as a slide preparation application. Finally, each item 139 can be converted into a whole activity by promoting the item 139 higher in the activity hierarchy.

Task Object Processing

Figure 6:
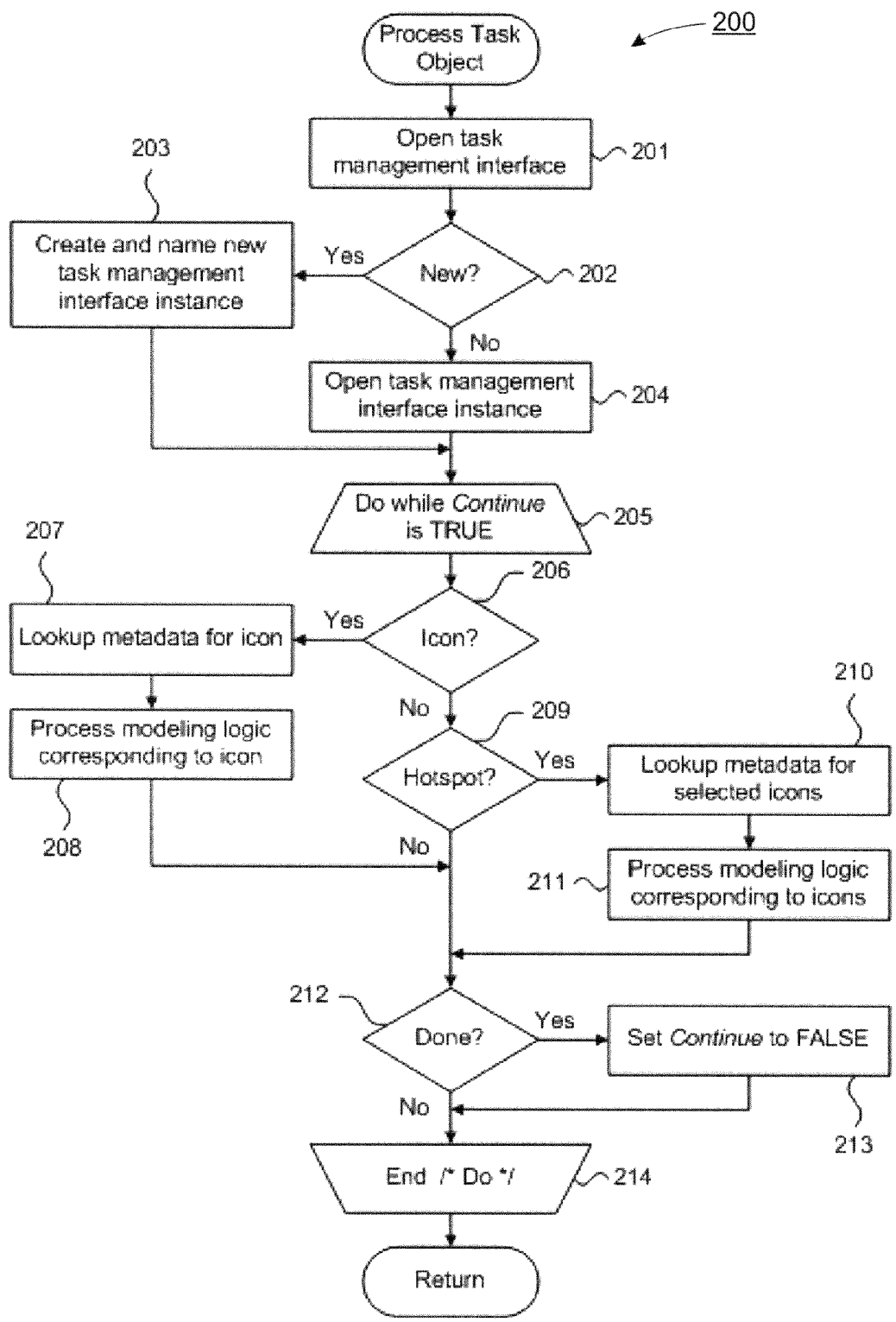
FIG. 6 is a flow diagram showing a routine for processing a task object for use by the method of FIG. 3.

FIG. 6 is a flow diagram showing a routine 200 for processing a task object 129 for use by the method 150 of FIG. 3. One purpose of this routine is to interactively process user selections and data submitted through a specific instance of the task management interface 170.

First, the task management interface 170 is opened using the task viewer 122 (block 201). The task management interface 170 opens as a specific instance of a template instantiated to a task object 129. Thus, if the task management interface 170 is being opened for a new instance (block 202), a new task management interface instance is created (block 203). In one embodiment, the user is prompted to select a template 134, which is instantiated to a new task object 129, named and opened by the task viewer 122. Otherwise (block 202), an existing task management interface is opened (block 203). In one embodiment, the user is prompted to select a stored task management instance, which is retrieved and opened by the task viewer 122. For example, a user would be presented with a task management interface 170 by selecting the instance instantiated to the presentation task object 172 for the "Congress Presentation."

User selections and data submitted through the task management interface instance are then iteratively processed (blocks 205-213) as follows. During each iteration (block 205), if a task-oriented item 139 is dragged over an icon 173 (block 206), the metadata 140 associated with the selected icon 173 is looked up and tagged to the item 139 (block 207) and the modeling logic 135 is processed for the icon 173 (block 208), as further described below beginning with reference to FIG. 8 et seq. For example, a user dragging an email 130 or contact 133 over the Venue/Event icon 176 would trigger the modeling logic 135 to tag the metadata 140 associated with the icon 176 to the email 130 or contact 133 and to present a visualization of the metadata 140. Alternatively, if a task-oriented item 139 is dragged over the hotspot 194 (block 209), the metadata 140 associated with each of one or more selected icons 173 is looked up and tagged to the item 139 (block 207) and the modeling logic 135 is processed for the selected icons 173 (block 208), as further described below beginning with reference to FIG. 8 et seq. For example, a user selecting the Venue/Event icon 176 and Host icon 177 and then dragging an email 130 or contact 133 over the selected icons 176, 177 would trigger the modeling logic 135 to tag the metadata 140 associated with the selected icons 176 to the email 130 or contact 133 and to present visualizations of the metadata 140. If processing within the task management interface instance is incomplete (block 211), processing continues with a next user selection or data entry (block 213). Otherwise, the Continue flag is set to false (block 212) and processing completes (block 215). The routine then returns.

Detailed Example

Figure 7:
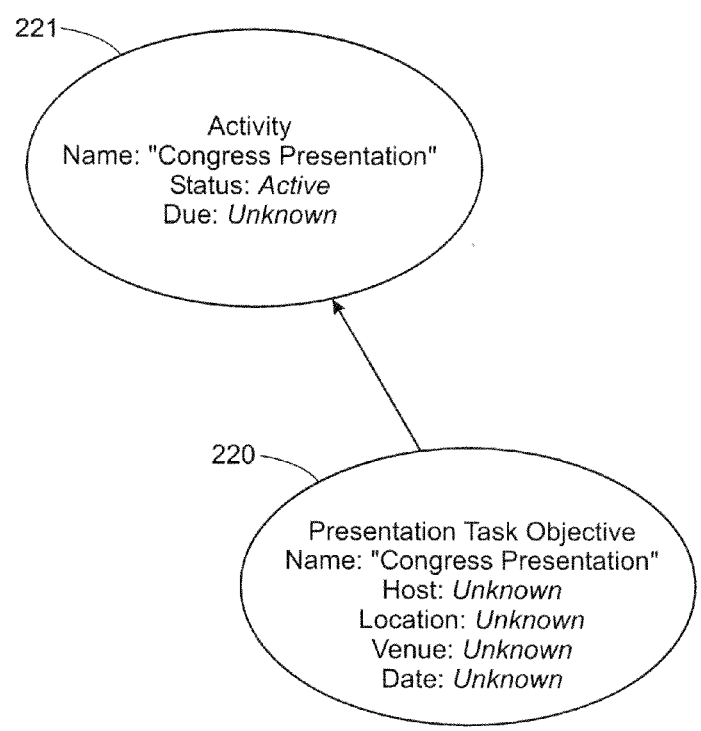
FIG. 7 is a block diagram showing, by way of example, a new task object created by the task viewer of FIG. 2.

FIG. 7 is a block diagram showing, by way of example, a new task object 220 created by the task viewer 122 of FIG. 2. This detailed example is based on the preparation of a slide presentation to be given as testimony to Congress. Alice, a user, lives in San Francisco, Calif. She receives an email 130 from a colleague, Bob, in Washington, D.C., inviting her to testify before Congress. Alice opens the task management interface 170 using the task viewer 122. In response, the task viewer 122 instantiates a new instance of a template 134 to create a specific instance of a presentation task object 220, which Alice names "Congress Presentation." In addition, modeling logic 135 associated with the presentation task object 220 triggers the creation of a new instance of a activity 221. The activity 221 is also named "Congress Presentation" with an active status. The activity 221 is associated with the presentation task object 220 and will subsequently appear during each visualization 138 of the presentation task object 220, such as when Alice views her To-Do list using the activity manager 124.

The remainder of this detailed example will be presented in combination with a discussion of modeling logic 135 associated with the specific icons 173 provided in the "Congress Presentation" task management interface instance.

Icon Logic Processing

Modeling logic 135 is associated through one or more of the templates 134 with individual task-oriented items 139, including task objects 129, email 130, activities 131, events 132, and contacts 133. Other task-oriented items 139 could also be associated. The modeling logic 135 applies task-specific logic and reasoning that is triggered by dragging a task-oriented item 139 over a particular icon 173. The modeling logic 135 processes the item 139 and stores the item 139 with appropriate metadata 140. For example, the modeling logic 135 will ascertain that a date in an email 130 or event 132 dragged onto the Venue/Event icon 176 represents the date of the event, which can be used to set in motion related logic about the timing associated with reminders, such as when to prepare slides or book a flight in relation to this newly-captured event date. If the user clicks on the icon 176, the task management interface instance provides access to the stored and modeled task-oriented items 139 associated with the icon 176. By clicking on the Venue/Event icon 176, the task management interface instance displays the inferred date and provides access to the original email 130 or event 132 from which the date was extracted. The modeling logic 135 for a particular task-oriented item 139 can also be indirectly triggered through causal inferences by the modeling logic 135 to another item 139, even though the first item 139 is not directly associated with the selected icon 173 or the action that triggered the execution of the modeling logic 135.

The following examples of icon logic processing are described with reference to the detailed example of Alice's slide presentation to Congress. However, the icon logic processing is merely set forth as an example and includes countless other types of actions, triggers, interrelationships and effects based on the nature of the task management interface instance and actions required.

Host Icon Logic Processing

Figure 8:
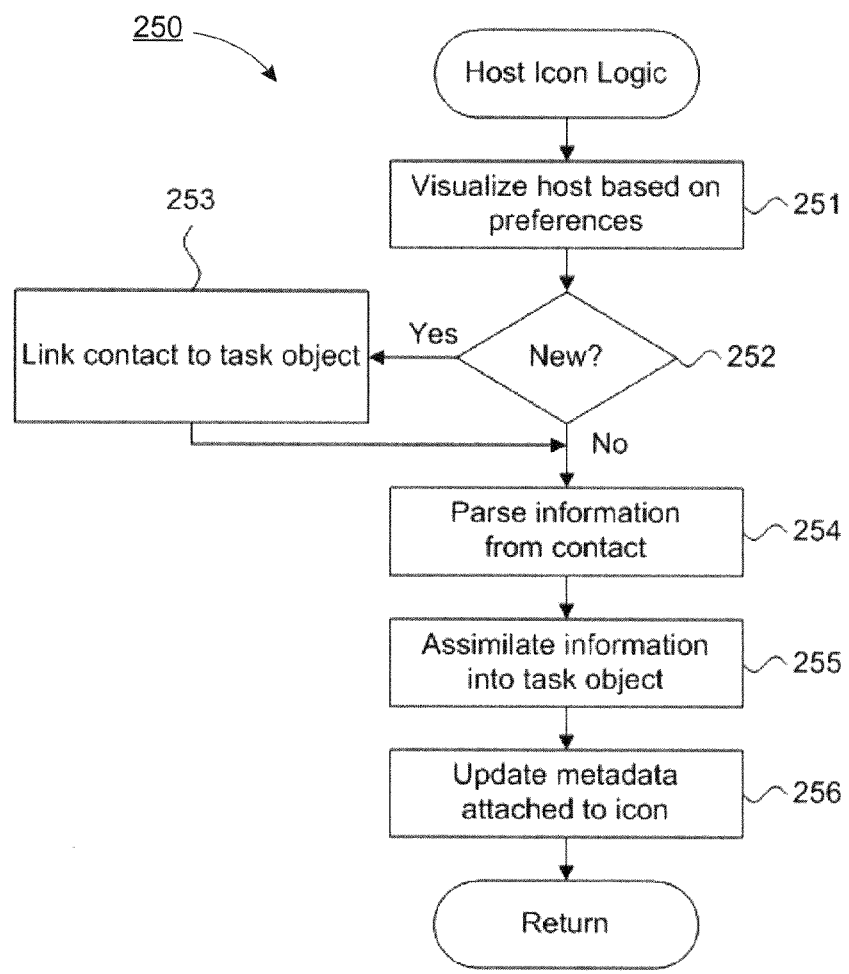
FIG. 8 is a flow diagram showing, by way of example, a routine for processing host icon logic for use by the routine of FIG. 6.

FIG. 8 is a flow diagram showing, by way of example, a routine for processing host icon logic 250 for use by the routine 200 of FIG. 6. One purpose of this routine is to execute the modeling logic 135 associated through an instantiated template with the Host icon 177. Interaction with the icon 177 triggers the logical attachment of metadata 140 identifying the host of a presentation to any task-oriented object 139 dragged onto or otherwise associated with that icon 177. Other functions can also be provided by the icon.

As an initial step, the contact 133 associated with presentation task object 172 and representing the host for the presentation is visualized based on any preferences stored as metadata 140 for visualizing contacts (block 250). If the host is new and was not previously specified within the context of the presentation task object 172 (block 252), a new contact 133 is created and linked to the task object 129 (block 253). The information specified in the contact 133 is parsed (block 254) and assimilated into the task object 129 (block 255). For example, the Host icon 177 could have associated metadata 140 storing contact information logically indicated by the link to the contact 133. In a further embodiment, the user is prompted either in addition to or in lieu of parsing the contact 133 for information. In a still further embodiment, the contact 133 is automatically opened and the user can drag relevant data to data entry fields for the metadata 140. In a still further embodiment, the modeling logic 133 parses the contact 133 and presents a derived view in which the parsed data is highlighted. The user can then drag relevant data to data entry fields for the metadata 140. Finally, if necessary, any metadata 140 attached to the Host icon 177 is updated (block 256), after which the routine returns.

Figure 9:
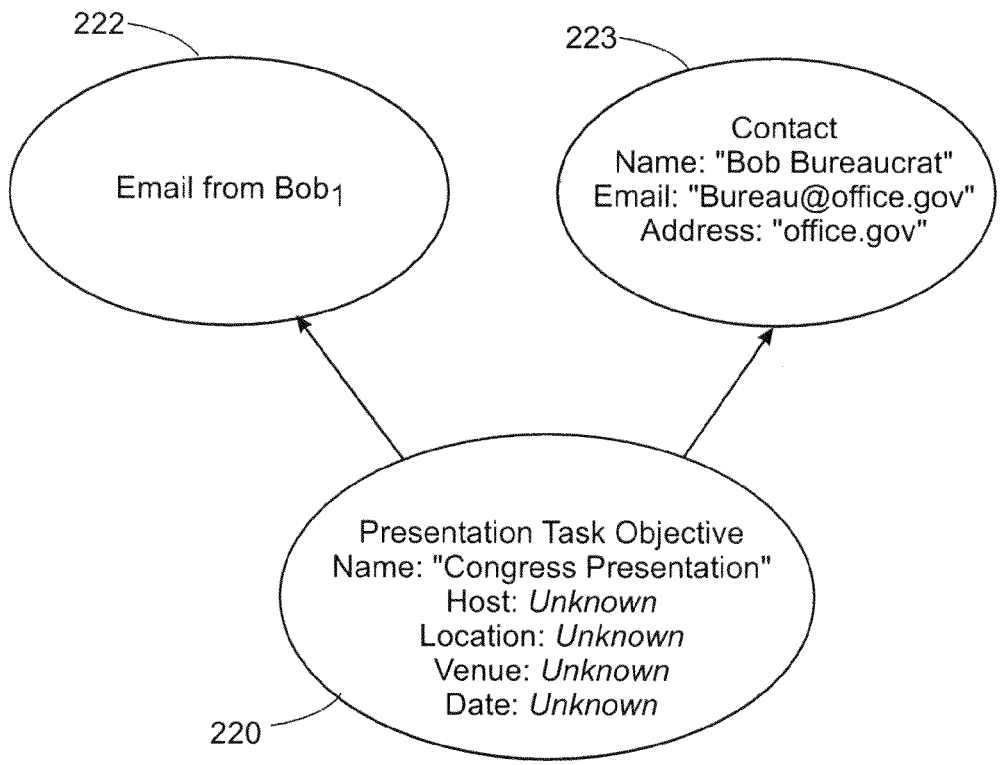
FIG. 9 is a block diagram showing, by way of example, the task object updated by the task viewer of FIG. 2.

Referring back to the detailed example, FIG. 9 is a block diagram showing, by way of example, the task object 220 updated by the task viewer 122 of FIG. 2. Alice drags the original email 222 from Bob onto the Host icon 177 in the task management interface instance. In response, the modeling logic 135 associated with the Host icon 177 stores a link to the email 222, which remains in Alice's email client 123. The modeling logic 135 extracts Bob's name, Bob Bureaucrat, and his email address, Bureau@office.gov, from the email 222. The modeling logic 135 then stores the data as metadata 140 also associated with the Host icon 177 to indicate that Bob is the host for this instance of a presentation. In addition, the modeling logic 135 extracts Bob's address from his signature, adds his address to a contacts store maintained in the task environment 121 and stores his address as the default location for the Congress presentation in the presentation task object 220.

Correspondence Icon Logic Processing

Figure 10:
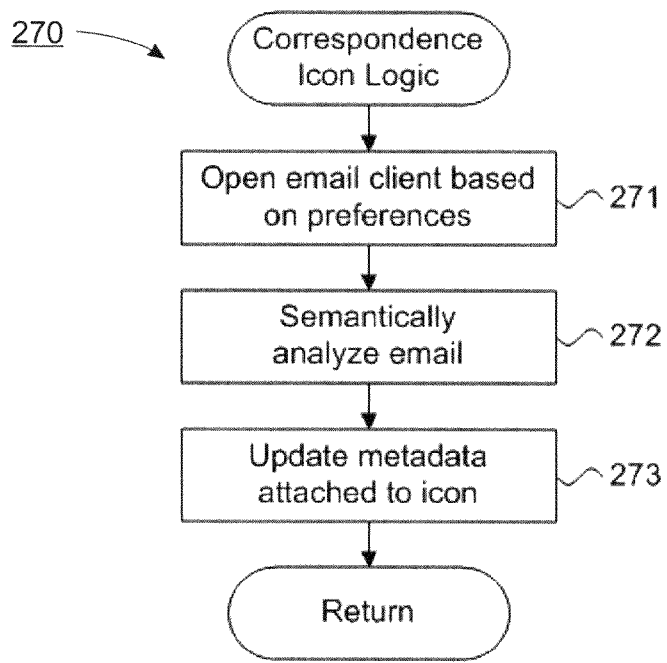
FIG. 10 is a flow diagram showing, by way of example, a routine for processing correspondence icon logic for use by the routine of FIG. 6.

FIG. 10 is a flow diagram showing, by way of example, a routine for processing correspondence icon logic 270 for use by the routine 200 of FIG. 6. One purpose of this routine is to execute the modeling logic 135 associated through an instantiated template with the Correspondence icon 179. The icon logically interfaces the task viewer 122, as executed through a task management interface instance, to the email client 123. However, the modeling logic 135 associated with the Correspondence icon 179 causes any email to be analyzed and any information gleaned assimilated into the presentation task object 172. Other functions can also be provided by the icon.

The email client 123 is opened based on any preferences stored as metadata 140 for processing email (block 250). Each email 130 is semantically analyzed (block 272) for pertinent content. For instance, the email 130 can be examined for keyword occurrences or based on simple lexical analysis. In a further embodiment, the user is prompted either in addition to or in lieu of analyzing the email 130 for information. In a still further embodiment, the email 130 is automatically opened and the user can drag relevant data to data entry fields for the metadata 140. In a still further embodiment, the modeling logic 133 parses the email 130 and presents a derived view in which the parsed data is highlighted. The user can then drag relevant data to data entry fields for the metadata 140. Other forms of semantic analysis are possible, as well as other forms of analysis in general, including linguistic analysis. Other task-oriented items 139 can also be semantically analyzed. Finally, if necessary, any metadata 140 attached to the Correspondence icon 179 is updated (block 273), after which the routine returns.

Figure 11:
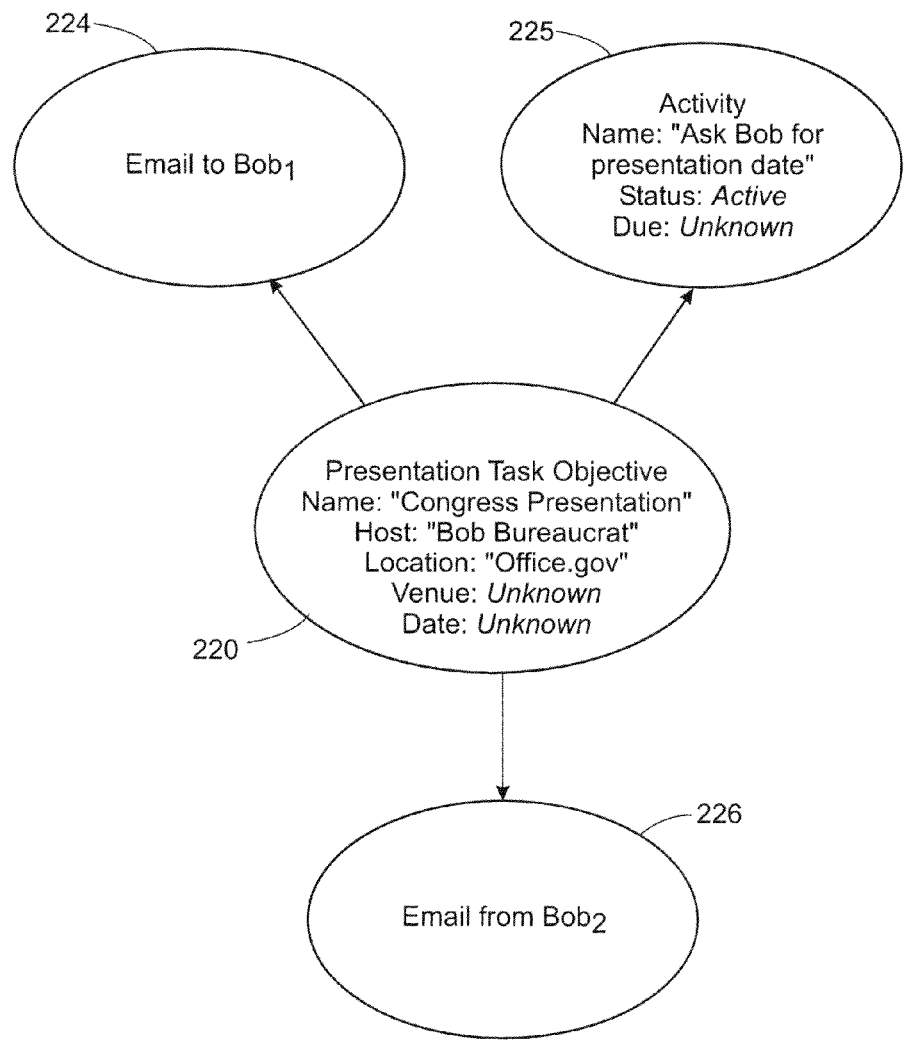
FIG. 11 is a block diagram showing, by way of example, the task object further updated by the task viewer of FIG. 2.

Referring back to the detailed example, FIG. 11 is a block diagram showing, by way of example, the task object 220 further updated by the task viewer 122 of FIG. 2. Alice opens the new email 224 from inside the task management interface instance and replies to Bob's email 222 asking for a date on which he would like her to present her testimony. In response, the modeling logic 135 associated with the Correspondence icon 177 stores a link to the email 224, which remains in Alice's email client 123. Through semantic analysis, the modeling logic 135 determines that Alice is expecting a reply from Bob and keeps track of the outstanding reply by creating an activity 225. Alternatively, Alice could be prompted to indicate her email 224 is a request for a presentation date. For instance, clicking on the Host icon 177 could include an option to request a presentation date, which would open with a message to the host, that is, Bob, automatically populated with boilerplate language regarding presentation dates and could even suggest free dates taken from Alice's calendar. The activity 225 is kept in a store of tracked actions for others, that is, actions for other people that Alice might want to track. Bob quickly replies that he will have to get back to Alice on a presentation date. The modeling logic 135 determines from Bob's second email 226 that he still has not supplied a presentation date and recognizes that the activity 225 is not completed. Alternatively, Alice could indicate that Bob's date information is not what she needed. The presentation task object 172 associates the activity 225 for tracking Bob's action on behalf of Alice.

Planning Icon Logic Processing

Figure 12:
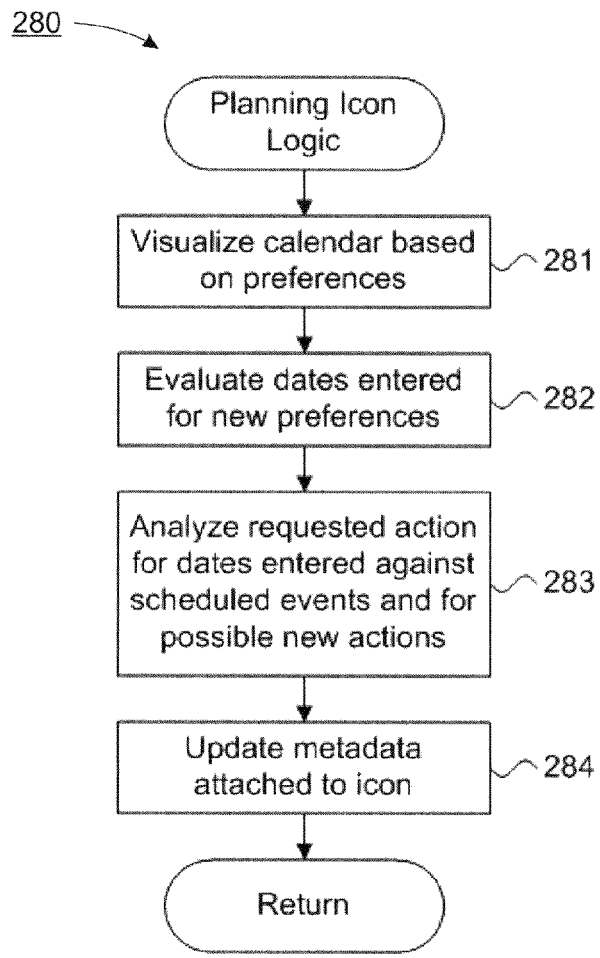
FIG. 12 is a flow diagram showing, by way of example, a routine for processing planning icon logic for use by the routine of FIG. 6.

FIG. 12 is a flow diagram showing, by way of example, a routine for processing planning icon logic 280 for use by the routine 200 of FIG. 6. One purpose of this routine is to execute the modeling logic 135 associated through an instantiated template with the Planning/Schedule icon 187. The icon logically interfaces the task viewer 122, as executed through a task management interface instance, to a visualization 138 of a calendar tracking events 132 associated with the presentation task object 172. Other functions can also be provided by the icon.

A visualization 138 of a calendar tracking events 132 associated with the presentation task object 172 is opened based on any preferences stored as metadata 140 for visualizing events 132 (block 281). The visualization 138 can operate as an event manager 125 within the context of the task management interface instance and separately from the actual event manager 125, such as further described below with reference to FIG. 31. Any dates entered are evaluated for new preferences (block 282). For example, a user might consistently schedule a certain type of event prior to the presentation date and the modeling logic 135 would statistically track the scheduling for consideration as default values for the template 134 from which the current presentation task object 129 has been instantiated. Each requested action for the dates entered is also analyzed against any schedule events 132 associated with the presentation task object 172 and for possible new actions (block 283) for pertinent content. Finally, if necessary, any metadata 140 attached to the Planning/Schedule icon 187 is updated (block 284), after which the routine returns.

Figure 13:
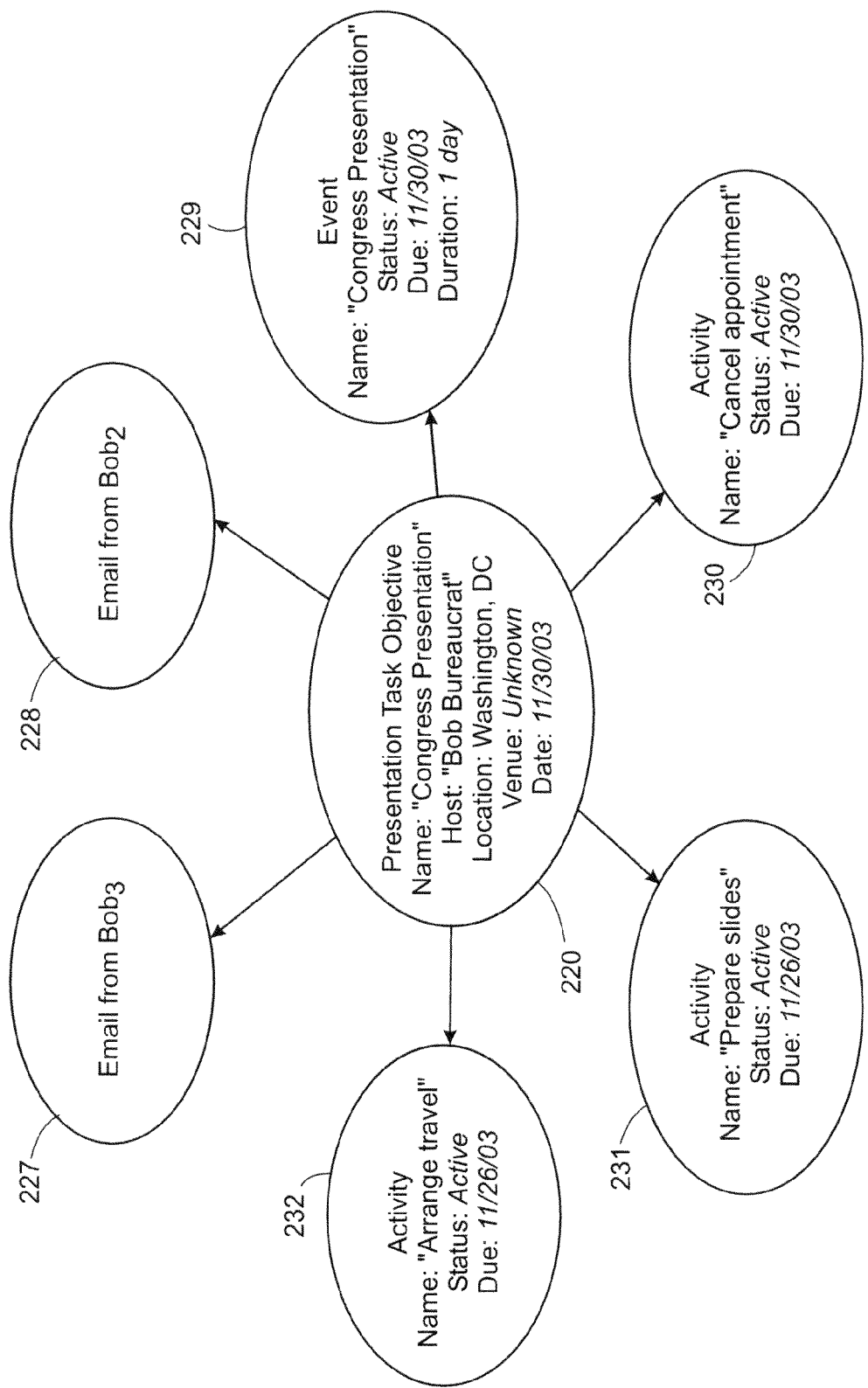
FIG. 13 is a block diagram showing, by way of example, the task object further updated by the task viewer of FIG. 2.

Referring back to the detailed example, FIG. 13 is a block diagram showing, by way of example, the task object 220 further updated by the task viewer 122 of FIG. 2. Two days following his last email 226, Bob replies with a third email 227 providing the address where Alice is to give the presentation and three possible dates, the first being under two weeks away. Bob's third email 227 arrives before the modeling logic 135 generates a reminder to Alice that she should ask Bob for a presentation date.

Alice then drags Bob's third email 227 to the Planning/Schedule icon 187. The modeling logic 135 stores a link to the email 227, which remains in Alice's email client 123 and opens Alice's calendar in her preferred seven-day weekly view at the week of the first date in Bob's email. Alice navigates to the second date, which is just over two weeks away, and creates an event 229 in her calendar, even though she already has an appointment scheduled. Alice then sends a second email 228 in reply to Bob to tell him that she has picked a date.

The modeling logic 135 is triggered by the new event 229 to specify actions that Alice probably needs to complete before the presentation event 229, such as preparing slides and canceling her conflicting appointment. The modeling logic 135 creates two new activities 230, 231 to respectively remind her to cancel her appointment and prepare slides. The modeling logic 135 also creates a third new activity 232 to remind Alice to arrange travel since the default address for the presentation task object 172 is in Washington, D.C. Finally, the modeling logic 135 highlights the clashing appointment in Alice's calendar, which will appear when she next visualizes her events 132.

Tickets Icon Logic Processing

Figure 14:
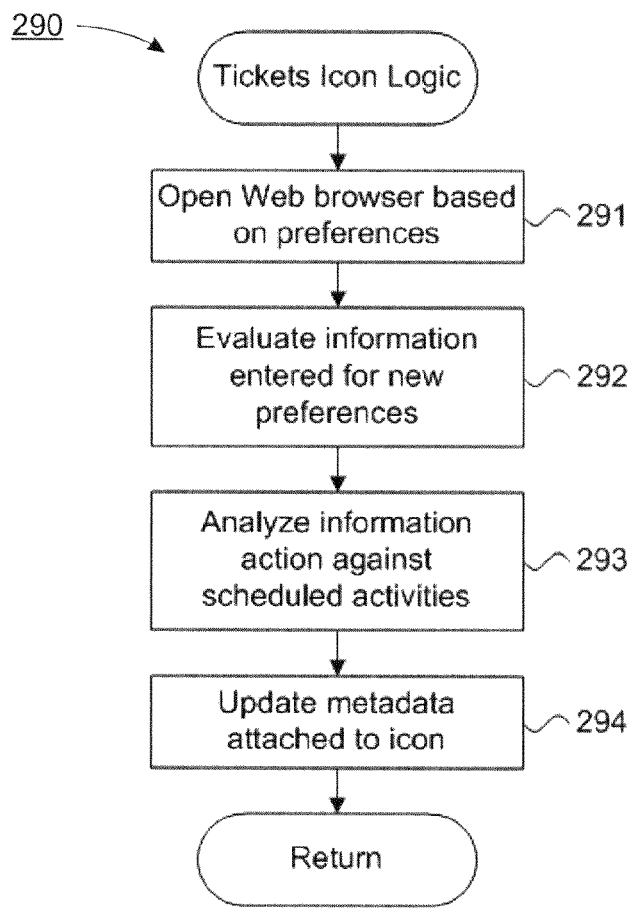
FIG. 14 is a flow diagram showing, by way of example, a routine for processing tickets icon logic for use by the routine of FIG. 6.

FIG. 14 is a flow diagram showing, by way of example, a routine for processing tickets icon logic 290 for use by the routine 200 of FIG. 6. One purpose of this routine is to execute the modeling logic 135 associated through an instantiated template with the Tickets icon 180. The icon logically interfaces the task viewer 122, as executed through a task management interface instance, to a Web browser application, which can be automatically loaded or semi-automatically loaded, such as using user prompting, using data provided by the modeling logic 135, or user, to book an airline reservation. Other functions can also be provided by the icon.

A Web browser is opened based on any stored preferences, such as bookmarks or default home page (block 291). Any information entered through the Web browser is evaluated for new preferences (block 292). For example, a new favorite discount ticket reseller might be bookmarked. The information is also analyzed against any scheduled activities 131 (block 293). Finally, if necessary, any metadata 140 attached to the Tickets icon 180 is updated (block 294), after which the routine returns.

Figure 15:
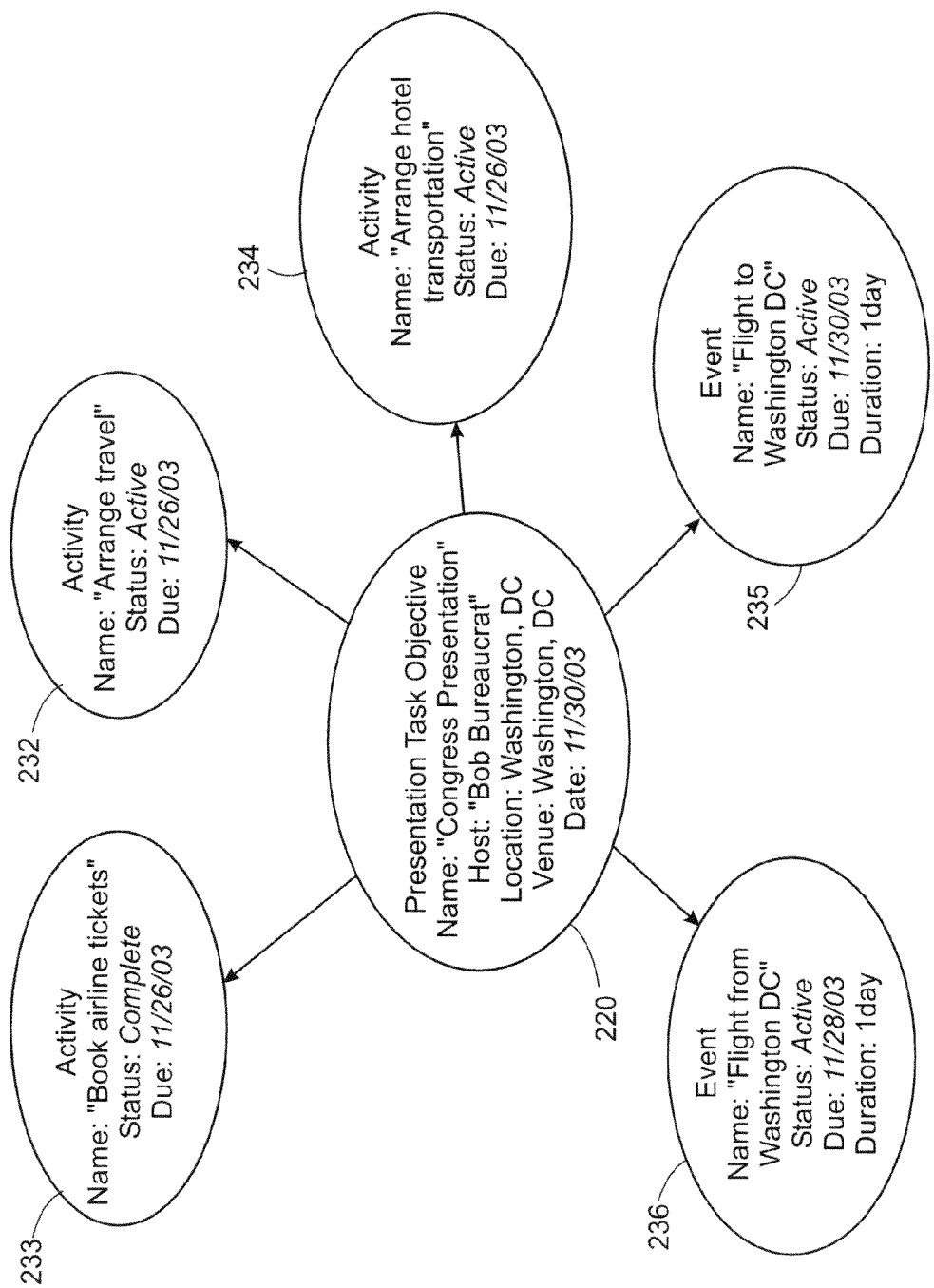
FIG. 15 is a block diagram showing, by way of example, the task object further updated by the task viewer of FIG. 2.

Referring back to the detailed example, FIG. 15 is a block diagram showing, by way of example, the task object 220 further updated by the task viewer 122 of FIG. 2. Alice does not need reminding about travel in this instance and immediately selects the Tickets icon 180 to book an airline reservation. The modeling logic 135 associated with the icon opens a Web browser bookmarked to her favorite airline. Alice logs into the Web site and books a roundtrip flight to Washington, D.C., with assistance from the modeling logic 135, which enters at least some of the requisite information automatically. In a further embodiment, Alice could be prompted to identify a Web site, such as by presenting a pull-down menu or set of radio buttons identifying airline Web sites. In response to Alice booking her flight, the modeling logic 135 changes the status of the activity 233 for booking airline tickets to complete. The activity 232 for arranging travel, however, remains active, as the modeling logic 135 determines that Alice has neither booked a rental car nor indicated that she wants to take a shuttle to her hotel. The modeling logic 135 then creates a new activity 234 to remind her to arrange hotel transportation and also creates two new events 235, 236 respectively for her outbound and return flights.

Venue Icon Logic Processing

Figure 16:
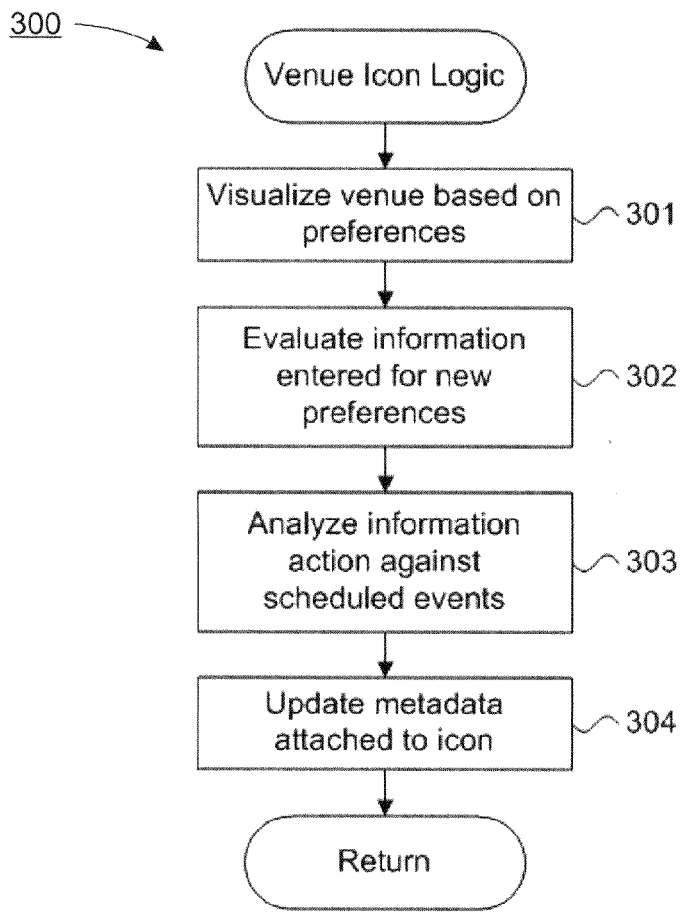
FIG. 16 is a flow diagram showing, by way of example, a routine for processing venue icon logic for use by the routine of FIG. 6.

FIG. 16 is a flow diagram showing, by way of example, a routine for processing venue icon logic 300 for use by the routine 200 of FIG. 6. One purpose of this routine is to execute the modeling logic 135 associated through an instantiated template with the Venue/Event icon 176. The icon logically interfaces the task viewer 122, as executed through a task management interface instance, to a visualization 138 of events 132 and metadata 140 associated with the presentation task object 172. Other functions can also be provided by the icon.

A visualization 138 of events 132 associated with the presentation task object 172 is opened based on any preferences stored as metadata 140 for visualizing events 132 (block 301). The visualization 138 can operate as an event manager 125 within the context of the task management interface instance and separately from the actual event manager 125, such as further described above with reference to FIG. 4. Any information entered through the visualization 138 is evaluated for new preferences (block 302) and analyzed against any schedule events 132 (block 303). Finally, if necessary, any metadata 140 attached to the Venue/Event icon 176 is updated (block 304), after which the routine returns.

Figure 17:
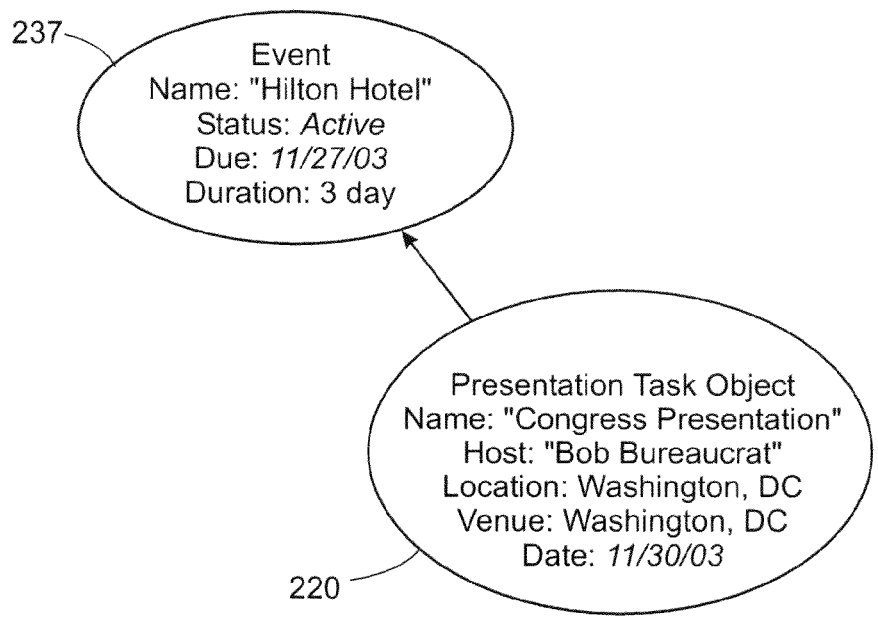
FIG. 17 is a block diagram showing, by way of example, the task object further updated by the task viewer of FIG. 2.

Referring back to the detailed example, FIG. 17 is a block diagram showing, by way of example, the task object 220 further updated by the task viewer 122 of FIG. 2. Alice selects the Venue/Event icon 176, which opens a set of tabbed visualizations 190, 191 for respectively describing geographic and organizational information regarding the presentation. The geography visualization 190 includes a set of dialogue boxes 192 into which she copies the address that Bob sent her. The geography visualization 190 also includes a Web page address dialogue box 193 to browse for hotels on the Web. The modeling logic 135 prepopulates the Web page address dialogue box 193 and executes a Web search for Hilton hotels in the Washington, D.C., area. Based on previous activities involving travel, the modeling logic 135 maintains preferences for Alice that record her Hilton Hotels Honors card and preference for staying at Hilton hotels whenever possible. The modeling logic 135 also returns a list (not shown) generated by, in this case, Hilton's Web server, ordered by distance from the city center. When Alice selects a convenient hotel, the modeling logic 135 populates the booking form (not shown) Alice's details, including her credit card number. Normally, Alice would stay another night after giving a presentation to meet with the participants. Thus, the modeling logic 135 retrieves her preference and inputs the default starting and ending dates for her stay as the nights before and immediately following her presentation date. Nevertheless, Alice edits the ending date because she wants to fly out right after her presentation and the modeling logic 135 records her change as a possible new preference. When her on-line hotel booking is complete, the modeling logic 135 creates a new event 237 saving an all-day event in her calendar for the evening of her arrival. The event 237 also contains useful information, such as the hotel address and number and her reservation confirmation code parsed from the entered information.

Figure 18:
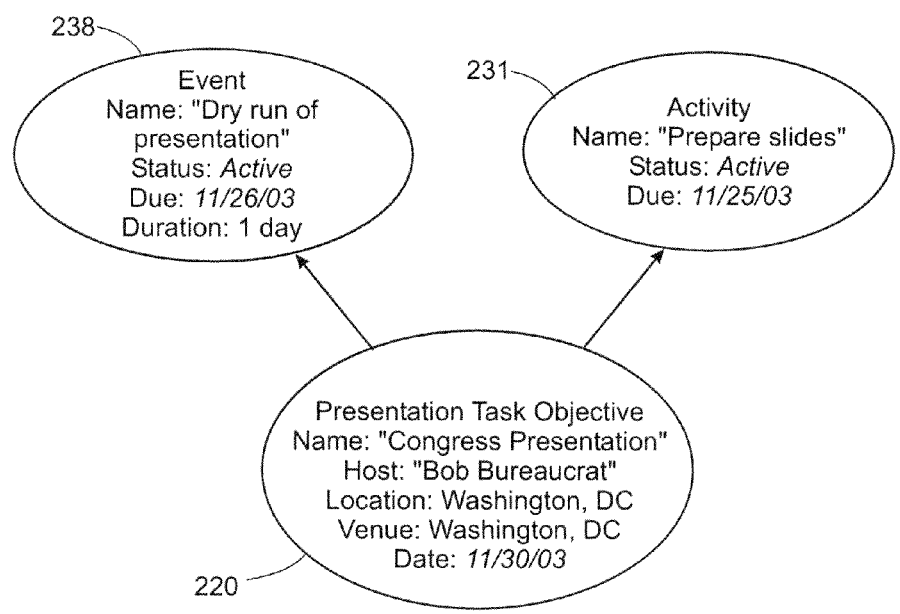
FIG. 18 is a block diagram showing, by way of example, the task object still further updated by the task viewer of FIG. 2.

Continuing with the detailed example, FIG. 18 is a block diagram showing, by way of example, the task object 220 still further updated by the task viewer 122 of FIG. 2. After booking her hotel reservation, Alice does some unrelated work for the next day or two. During that time, the activities 221, 231, and 232 respectively for her Congress presentation, preparing slides and arranging travel advance in her To-Do list 175 to show rising priorities as the presentation date approaches, such as described below with reference to FIGS. 27 and 29. Each of these items has a warning bar that turns from green to red as the deadline for each approaches.

Further, when Alice views her calendar during this period, she can see that the modeling logic 135 has added events 235, 236 for her booked flight times. Her calendar also includes a red-shaded event 231 for preparing her slides that falls on the day of her outbound flight to Washington, D.C. This deadline has been created by the modeling logic 135 based on knowledge that preparing for a presentation involves a fair amount of time and needs a deadline notification in the calendar to prevent overbooking. Since Alice does not have much free time before her departure, her calendar is already heavily shaded in red between appointments for quite some time before the deadline, with the shading getting deeper red closer to the deadline to indicate greater time pressure. When the shading is deep red, Alice generally knows not to create any more appointments for herself.

Alice wants to do a dry run for this important presentation and arranges an event 238 with some colleagues occurring about two days before her flight to Washington, D.C. She drags the event 231 containing the deadline for preparing slides to a date falling just before the dry run event 238, which she created in her calendar. The modeling logic 135 prompts Alice to determine whether the event 231 for her dry run event is part of the presentation task object 172 for the Congress presentation, which she confirms. The modeling logic 135 records that future presentations may possibly involve dry run-type events and adds a notation to her task customization options. In subsequent instances of the presentation task object 172, if Alice wants to do a dry run for her presentation, she will be able to select "Dry Run" from a list of task options (not shown) and the modeling logic 135 will assist her in selecting free time in her calendar. The modeling logic 135 will also automatically move the deadline for slide preparation to just before the dry run event. If Alice makes an exception to a dry run, such as by moving the dry run event to occur after her travel date, the modeling logic 135 records the change, but will keep on suggesting a time range before travel, unless Alice makes more exceptions than non-exceptions to the stored preferences for dry run-type events.

Contacts Icon Logic Processing

Figure 19:
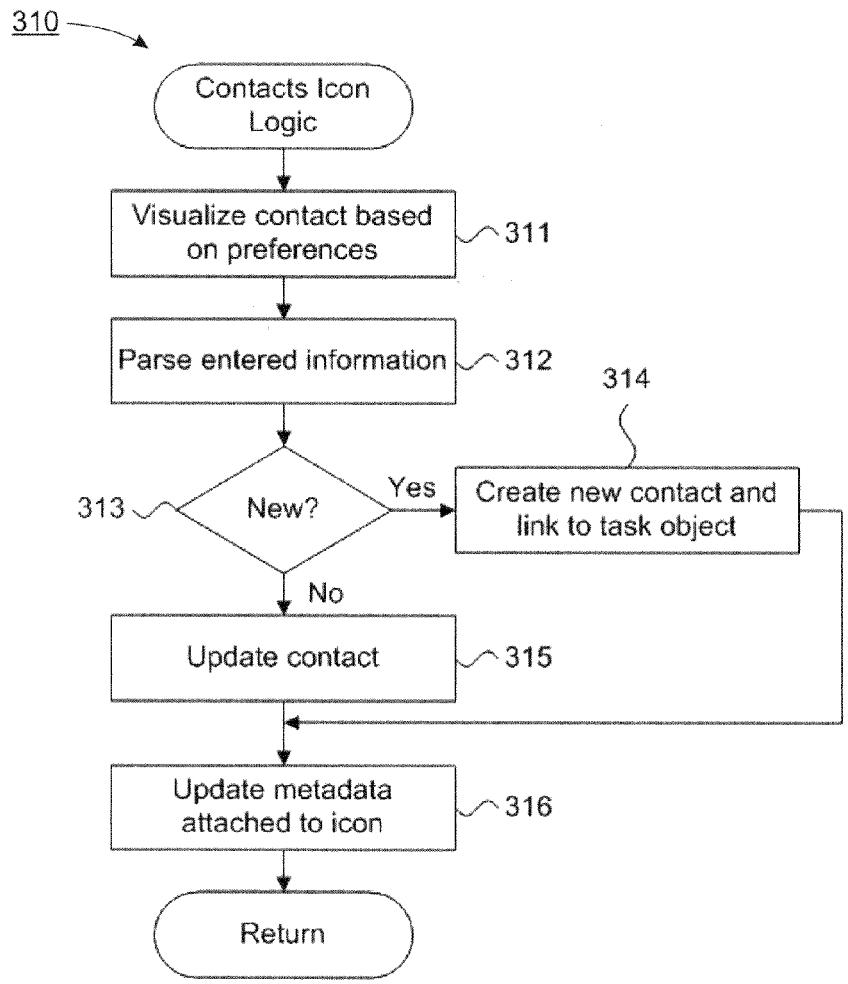
FIG. 19 is a flow diagram showing, by way of example, a routine for processing contacts icon logic for use by the routine of FIG. 6.

FIG. 19 is a flow diagram showing, by way of example, a routine for processing contacts icon logic 310 for use by the routine 200 of FIG. 6. One purpose of this routine is to execute the modeling logic 135 associated through an instantiated template with the Contacts icon 178. The icon logically interfaces the task viewer 122, as executed through a task management interface instance, to a visualization 138 of contacts 133 associated with the presentation task object 172. Other functions can also be provided by the icon.

A visualization 138 of contacts 133 associated with the presentation task object 172 is opened based on any preferences stored as metadata 140 for visualizing contacts 133 (block 311). The visualization 138 can operate as a contacts manager 126 within the context of the task management interface instance and separately from the actual contacts manager 126, such as further described below with reference to FIG. 39. Any information entered is parsed (block 312). If the information represents a new entry in the visualization 138 (block 313), the modeling logic 135 creates a new contact 133, which is linked to the presentation task object 172. Otherwise, the information is matched to an existing contact 133 and the contact 133 is updated (block 315). Finally, if necessary, any metadata 140 attached to the Contacts icon 178 is updated (block 284), after which the routine returns.

Figure 20:
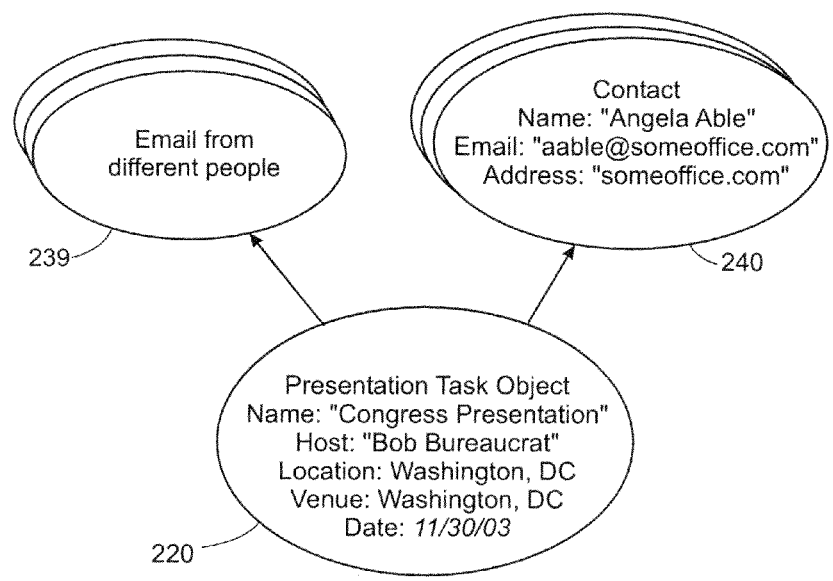
FIG. 20 is a block diagram showing, by way of example, the task object further updated by the task viewer of FIG. 2.

Referring back to the detailed example, FIG. 20 is a block diagram showing, by way of example, the task object 220 further updated by the task viewer 122 of FIG. 2. Over the next few days, Alice corresponds with various people in Washington, D.C. She adds new contacts 240 to the presentation task object 172 by dragging email 239 to the Contacts icon 178. Some of these people are already in her contacts database and some are not. Either way, the contacts 240 are all associated with the presentation task object 172 for the Congress presentation. Later, if Alice decides to cancel the Congress presentation, she can mail all or a subset of these contacts 240 by selecting the contacts 240 from a visualization 138 when she clicks on the Contacts icon 178.

Email 239 dragged to the Contacts icon 178 is also linked, along with any replies, as further task objects 129 forming collections of related email, which are maintained in a store associated with the presentation task object 172. Alice can inspect these task objects 129 by clicking on the Correspondence icon 179, as well as add additional email 239 and replies.

Slides Icon Logic Processing

Figure 21:
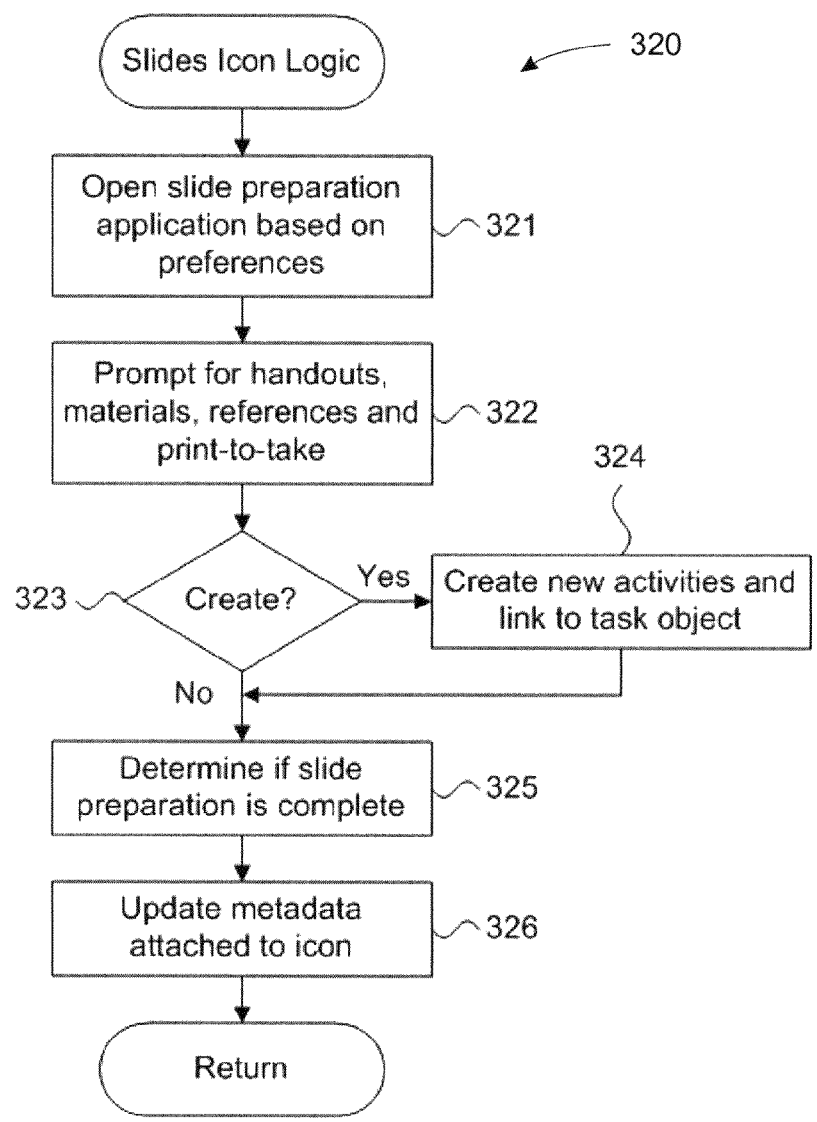
FIG. 21 is a flow diagram showing, by way of example, a routine for processing slides icon logic for use by the routine of FIG. 6.

FIG. 21 is a flow diagram showing, by way of example, a routine for processing slides icon logic 320 for use by the routine 200 of FIG. 6. One purpose of this routine is to execute the modeling logic 135 associated through an instantiated template with the Slides icon 182. The icon logically interfaces the task viewer 122, as executed through a task management interface instance, to a slide preparation application responsive to the user dragging a file containing slides over the Slides icon 182. Other functions can also be provided by the icon.

The modeling logic 135 examines metadata 140 associated with the file and opens a slide presentation application (block 321). If the metadata 140 is unrecognized, the user is prompted to select an appropriate application. For example, the user could be prompted to specify whether a new or existing file containing a set of slides is to be used. If a new set is to be created, the slide preparation application is opened based on any stored preferences, such as favorite slide background layout. If an existing slide set is being used, the modeling logic 135 displays a dialog box listing the slide sets identified within the task environment 121, optionally sorted by name, author, date, subject, or similar property. The user is allowed to rename the slide set and a new file containing the renamed slide set is logically stored in the task environment 121 by linking to a file stored in the underlying file system. Optionally, the user can specify a location within the file system in which to store the file.

The user is then prompted to indicate whether handouts, materials, references, or print-to-take items should be created by selecting the appropriate icon 183-185. If any of the prompts are selected (block 323), the modeling logic 135 creates a new activity 131, which is linked to the presentation task object 172 (block 324). The modeling logic 135 determines whether the slide preparation is complete (block 325), such as by prompting the user. Finally, if necessary, any metadata 140 attached to the Slides icon 182 is updated (block 326), after which the routine returns.

Figure 22:
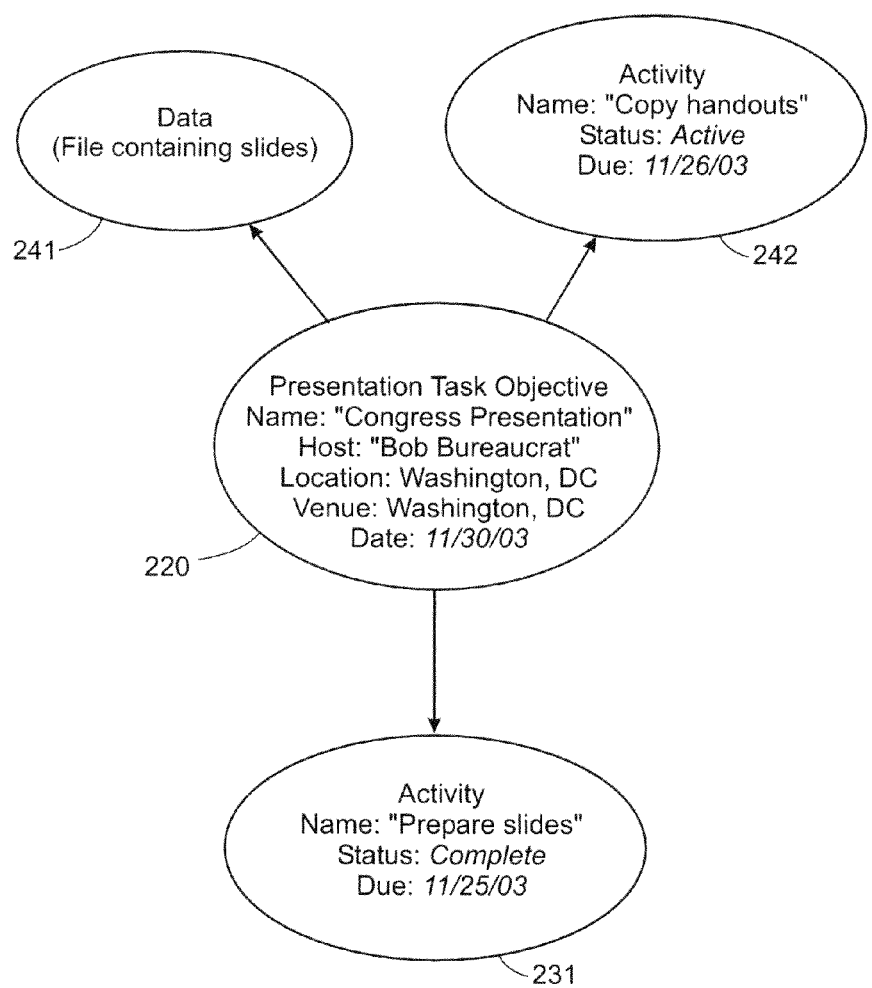
FIG. 22 is a block diagram showing, by way of example, the task object further updated by the task viewer of FIG. 2.

Referring back to the detailed example, FIG. 22 is a block diagram showing, by way of example, the task object 220 further updated by the task viewer 122 of FIG. 2. Over the next few days, the activity 321 for preparing slides moves to the top of Alice's To-Do list (not shown), followed by the activity 221 for the Congress presentation and activity 232 for arranging travel. Alice opens the task management interface instance, takes a file containing a set of slides 241 from a talk similar to the one she wants to give from another presentation task object 172, and drags the file 241 into the task management interface instance for the Congress presentation. Alternatively, Alice could be prompted to chose her slide set upon clicking the Slides icon 182. The modeling logic 135 prompts Alice regarding materials 183, handouts 184, references 184, and print-to-take items 185. She opts for only the handouts 184 and the modeling logic 135 creates a new activity 242 for copying handouts. Alice works on the slides for a while. When she closes the slide preparation application, the modeling logic 135 prompts her to determine if the slide preparation is finished, such as by providing a Slides Complete radio button. Alice indicates completion, which causes the modeling logic 135 to change the status of the activity 321 to complete and removes the activity 321 from her To-Do list 175.

Book Car Icon Logic Processing

Figure 23:
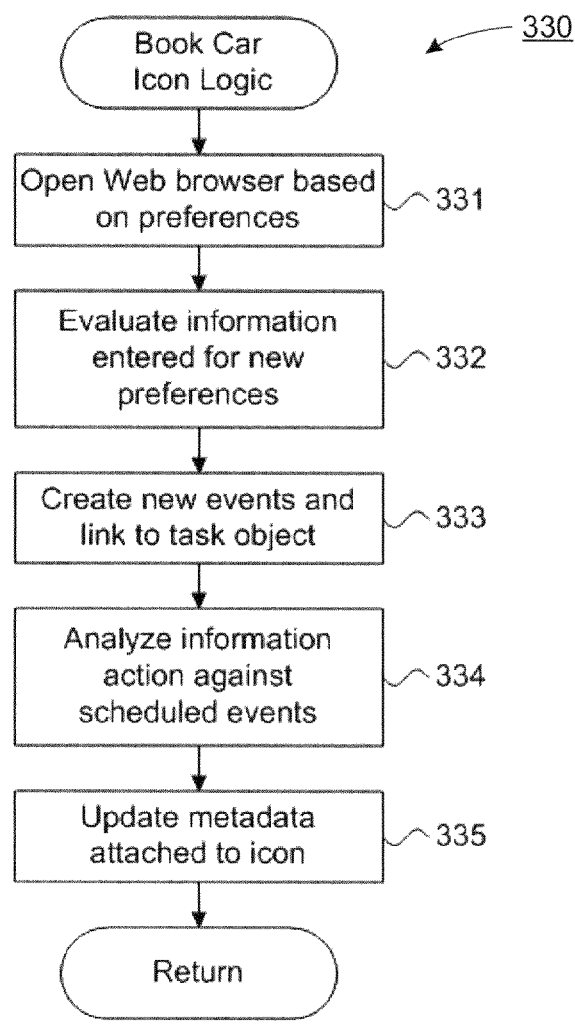
FIG. 23 is a flow diagram showing, by way of example, a routine for processing book car icon logic for use by the routine of FIG. 6.

FIG. 23 is a flow diagram showing, by way of example, a routine for processing book car icon logic 330 for use by the routine 200 of FIG. 6. One purpose of this routine is to execute the modeling logic 135 associated through an instantiated template with the Car Rental icon 181. The icon logically interfaces the task viewer 122, as executed through a task management interface instance, to a Web browser application, which is automatically loaded using data provided by the modeling logic 135 to book a rental car reservation. Other functions can also be provided by the icon.

A Web browser is opened based on any stored preferences, such as bookmarks or default home page (block 331). Any information entered through the Web browser is evaluated for new preferences (block 332). For example, a new favorite rental car agency might be bookmarked. Upon the completion of a reservation booking, new events 132 are created to pick up and drop off the rental car, which are linked to the presentation task object 172 (block 333). The information, including the newly added events, are analyzed against any existing scheduled events 132 (block 335). Finally, if necessary, any metadata 140 attached to the Car Rental icon 181 is updated (block 335), after which the routine returns.

Figure 24:
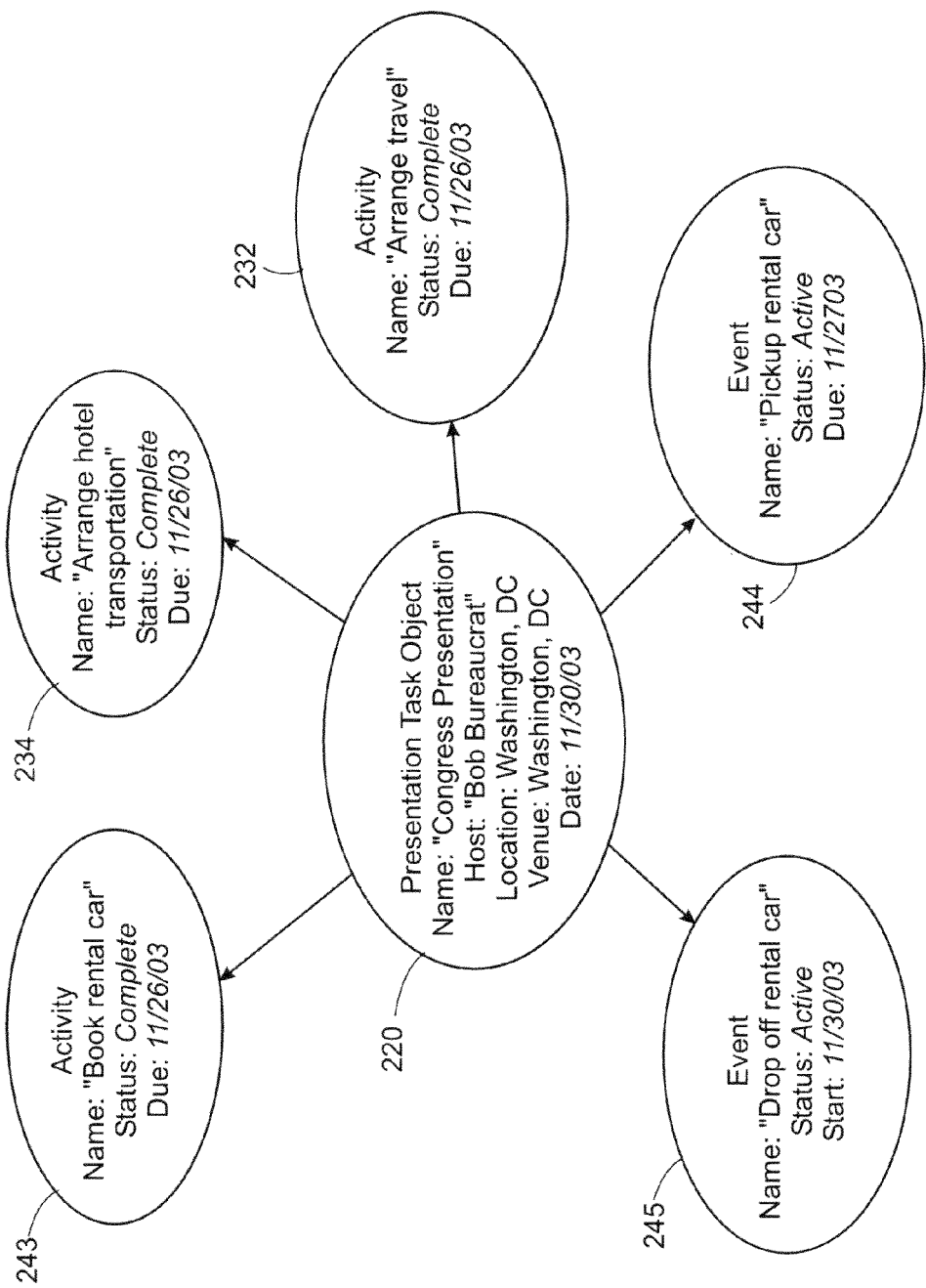
FIG. 24 is a block diagram showing, by way of example, the task object further updated by the task viewer of FIG. 2.

Referring back to the detailed example, FIG. 24 is a block diagram showing, by way of example, the task object 220 further updated by the task viewer 122 of FIG. 2. Alice books a rental car, with the help of the modeling logic 135. In response to the completion of booking, the modeling logic 135 changes the status of the activities 232, 234 and 242 respectively for arranging travel, arranging hotel transportation and booking a rental car to complete and removes the activities 232, 234 and 242 from her To-Do list 175. The modeling logic 135 also creates, based on implications of reserving a rental car, two new events 244, 245 for respectively picking up and dropping off her rental car respectively after her flight to Washington, D.C., and before her return flight.

Figure 25:
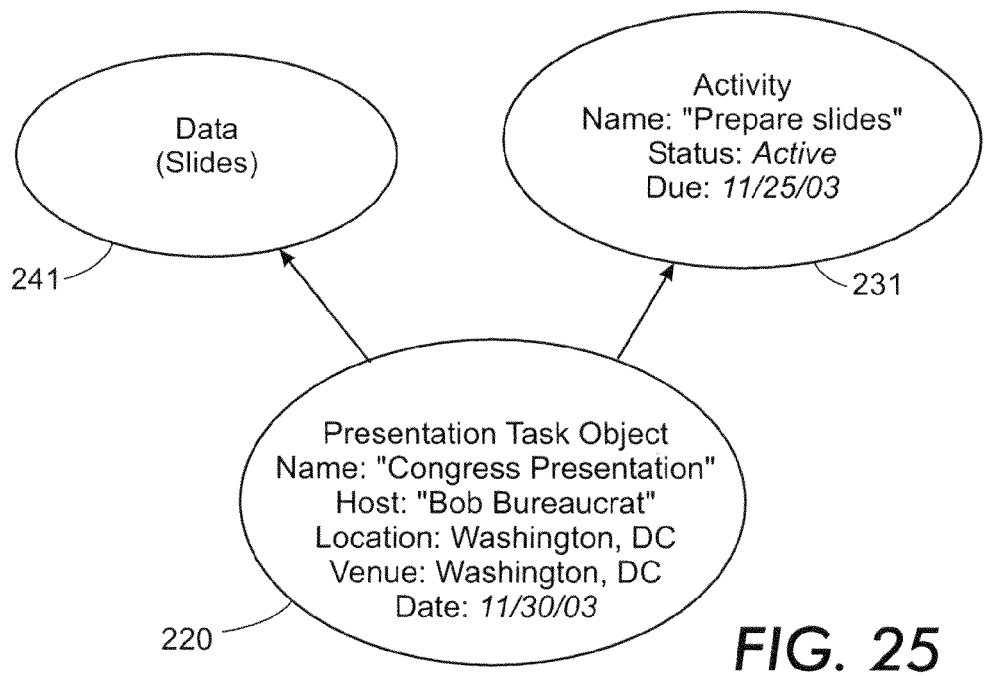
FIG. 25 is a block diagram showing, by way of example, the task object still further updated by the task viewer of FIG. 2.

Concluding with the detailed example, FIG. 25 is a block diagram showing, by way of example, the task object 220 still further updated by the task viewer 122 of FIG. 2. Soon after booking her rental car, Alice goes through her dry run and receives lots of comments on her slides. She reopens the file 241 containing her slides using the slide preparation application. In response, the modeling logic 135 changes the status of the activity 321 for preparing slices back to active. Alice makes some changes to her slides, but tires before finishing. When she closes the slide preparation application, the modeling logic 135 prompts Alice to determine whether her slide preparation is again complete. Alice indicates that she is not done and the activity 321 returns to her To-Do list 175 as active. At this time, the activity 321 is immediately at the top of her To-Do list 175 with a mostly red warning bar based on the modeling logic inference that she must complete her slides soon. In this situation, however, since she has just completed her dry run, the modeling logic 135 applies general reasoning about slide preparation, which dictates that slides must be completed before traveling to give a presentation. If Alice is late in finishing her slides and completes her slides on the plane, the modeling logic 135 may determine that slides can also be completed on the flight out to give a presentation and update her preferences accordingly.

In the detailed example, Alice uses a tablet personal computer. When she leaves, she is able to take the full task environment 121 with her. However, since her tablet personal computer is difficult to use as a reminding device when she is on the move, Alice downloads some information from her presentation task object 172 for the Congress presentation, including her email 130 and calendar, into a personal digital assistant. Thus, upon arrival at her destination, Alice is able to access her rental car and hotel information in the calendar.

In conclusion, Alice's presentation is a great success. She closes the presentation task object 172 and the modeling logic 135 determines that the presentation event is complete. The modeling logic 135 changes the status of the original activity 221 for the Congress presentation to complete and removes the activity 221 from her To-Do list. The presentation task object 172 is then archived, along with all of the content, metadata 140 and properties 141 in the system store.

Visualization Processing

Visualizations 138 are associated with individual task-oriented items 139, including task objects 129, email 130, activities 131, events 132, and contacts 133. Other task-oriented items 139 could also be associated. Each visualization 138 presents one or more individual task-oriented items 139 in a consolidated view based, in part, on the literal content of each item and any associated metadata 140 and computation over the metadata 140 in terms of the modeling logic 135 for the particular task in question. The visualizations 138 can operate as within each item manager, including the task viewer 122, email client 123, activity manager 124, event manager 125, and contacts manager 126. In addition, the visualizations 138 can operate within the context of a task management interface instance and separately from the item managers.

The following examples of visualizations 138 are described with reference to various examples. However, the visualization processing is merely set forth as examples and includes countless other types of actions, triggers, interrelationships and effects based on the nature of the task-oriented items 139 being visualized, task management interface instance, item managers, and actions required.

Reminder Bar Visualization in an Activity Manager

Figure 26:
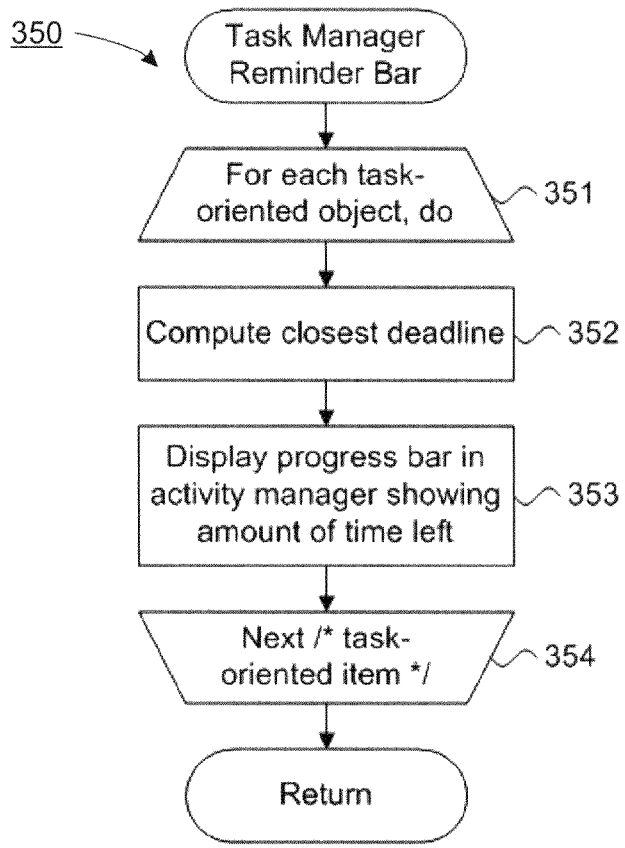
FIG. 26 is a flow diagram showing a routine for visualizing activity manager reminder bars for use in the routine of FIG. 6.

FIG. 26 is a flow diagram showing a routine for visualizing activity manager reminder bars 350 for use in the routine 200 of FIG. 6. One purpose of this routine is to present an aggregate visual representation of multiple reminders associated with one or more task-oriented items 139 in a activity manager view in the activity manager 124 or within the context of a task management interface instance.

For each task-oriented item 139 (block 351), the closest deadline is computed (block 352). Each task-oriented item 139 can have a separate deadline and the deadline closest to the current date is selected. A progress bar is then displayed in a activity manager 124 or task management interface instance showing the amount of time left before each closest deadline for each of the task-oriented items 139 (block 353), as further described below with reference to FIG. 22. Processing continues with each remaining task-oriented item 139 (block 354), after which the routine returns.

Figure 27:
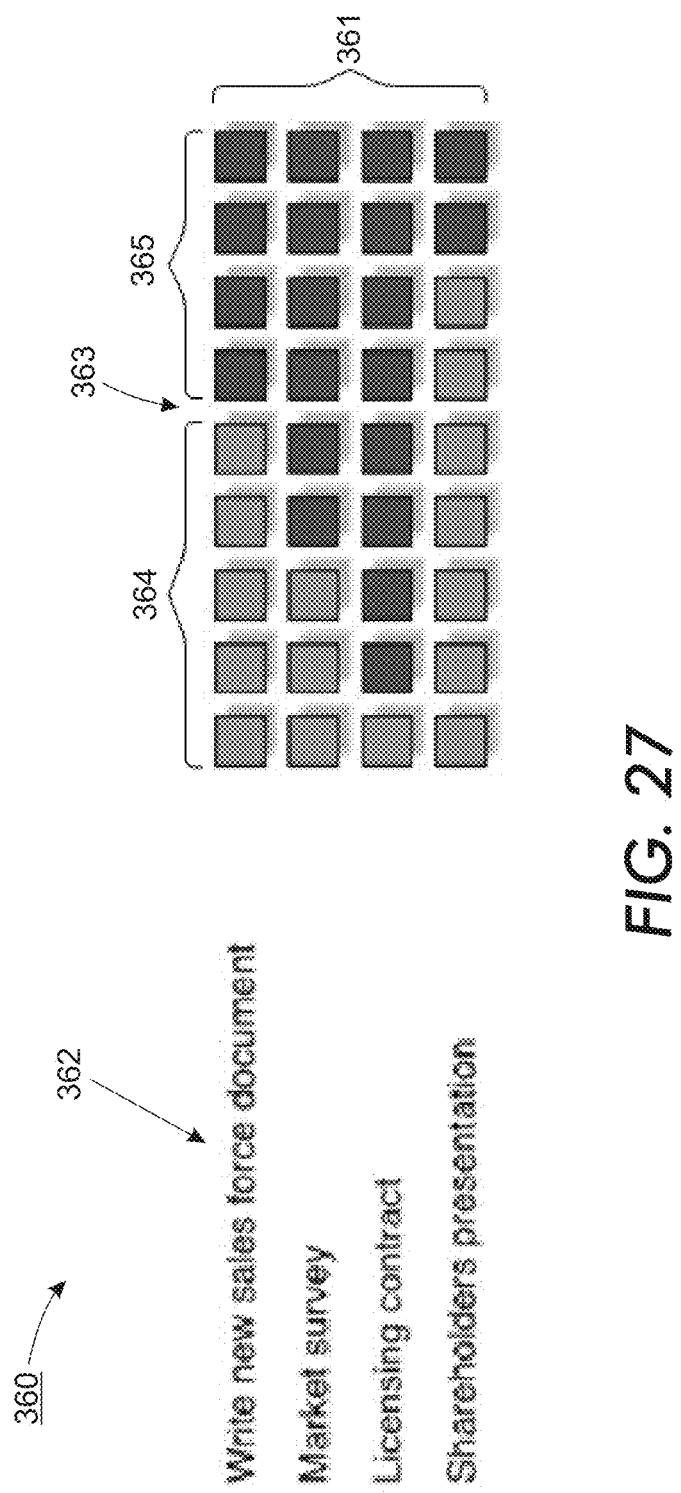
FIG. 27 is a screen display showing, by way of example, activity manager reminder bars as visualized by the routine of FIG. 26.

FIG. 27 is a screen display 360 showing, by way of example, activity manager reminder bars 363 as visualized by the routine 350 of FIG. 26. The activity manager activity reminder bars 363 provide a means for accessing the original task-oriented items 139. A set of reminder bars 363 is displayed for a plurality of items 139. Each reminder bar 363 is displayed, for instance, in two colors with the green squares 343 on the left representing days before the deadline associated with the task-oriented items 139 and the red squares 344 on the right representing days after the deadline. A short description 342 of each task-oriented items 139 is also provided. Visually, the more red squares that the user sees, the more the user knows that the deadlines are getting closer. Other forms, colors and arrangements of activity reminder bars 363 are possible.

Reminder Bar Visualization in an Activity List View

Figure 28:
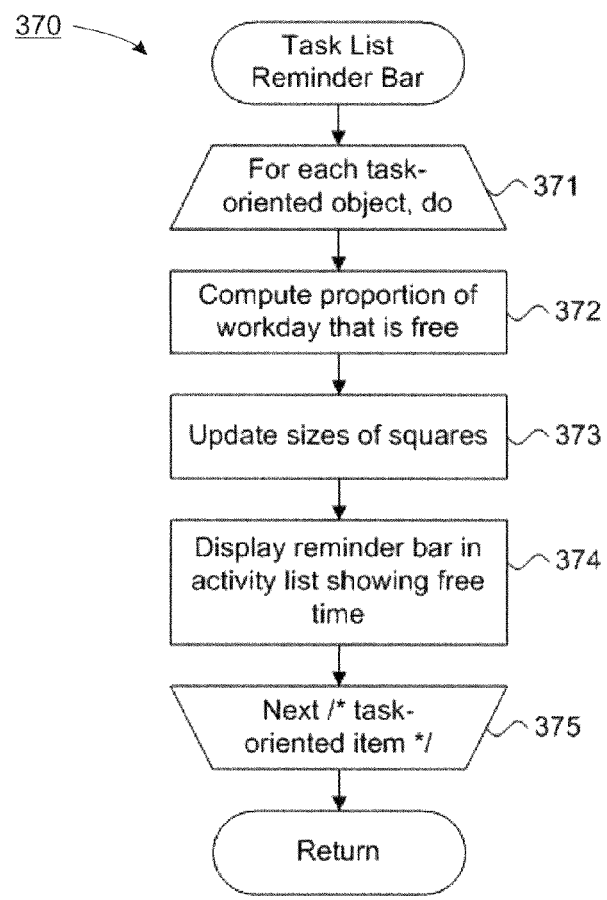
FIG. 28 is a flow diagram showing a routine for visualizing activity list reminder bars for use in the routine of FIG. 6.

FIG. 28 is a flow diagram showing a routine for visualizing activity list reminder bars 370 for use in the routine 200 of FIG. 6. One purpose of this routine is to present an aggregate visual representation of multiple reminders associated with one or more task-oriented items 139 in an activity list view in the activity manager 124 or within the context of a task management interface instance.

For each task-oriented item 139 (block 371), the proportion of each workday associated with a task-oriented item 139 is computed (block 372). The sizes of squares associated with each workday are updated (block 373) to reflect the amount of time used up by each scheduled item occurring on the same workdays. A reminder bar is then displayed in a activity list view showing the amount of free time available for each workday (block 374), as further described below with reference to FIG. 29. Processing continues with each remaining task-oriented item 139 (block 375), after which the routine returns.

Figure 29:
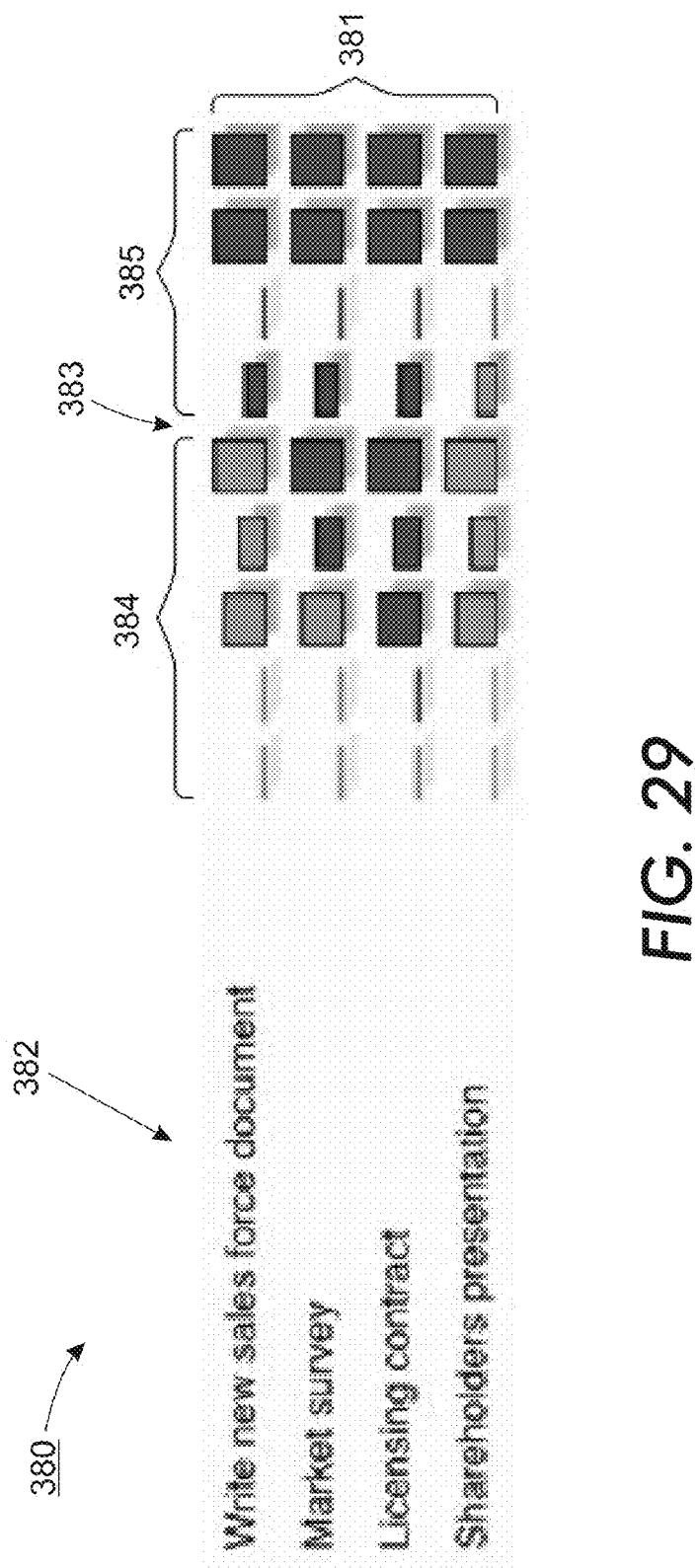
FIG. 29 is a screen display showing, by way of example, activity list reminder bars as visualized by the routine of FIG. 28.

FIG. 29 is a screen display 380 showing, by way of example, activity list reminder bars 383 as visualized by the routine 370 of FIG. 28. The activity list reminder bars 383 provide a means for accessing the original task-oriented items 139. A set of reminder bars 363 are displayed for a plurality of items 139. As in the activity manager view described above with reference to FIG. 27, each reminder bar 363 is displayed, for instance, in two colors with the green squares 383 on the left representing days before the deadline associated with the task-oriented items 139 and the red squares 384 on the right representing days after the deadline. However, each "square" in each reminder bar 363 is sized proportionate to the amount of free time available for a particular workday. A short description 382 of each task-oriented item 139 is also provided. Visually, the larger the squares that user sees, the less time is available, whether occurring before or after a deadline. In a further embodiment, the reminder bars 383 could also refer to individual task-oriented items 139 in a To-Do list 175 and approaching deadlines associated with the items. Only one deadline would be shown for each item 139 and the modeling logic 135 would not need to compute nearest deadlines. Other forms, colors and arrangements of activity list reminder bars 383 are possible.

Reminder Bar Visualization in a Calendar View

Figure 30:
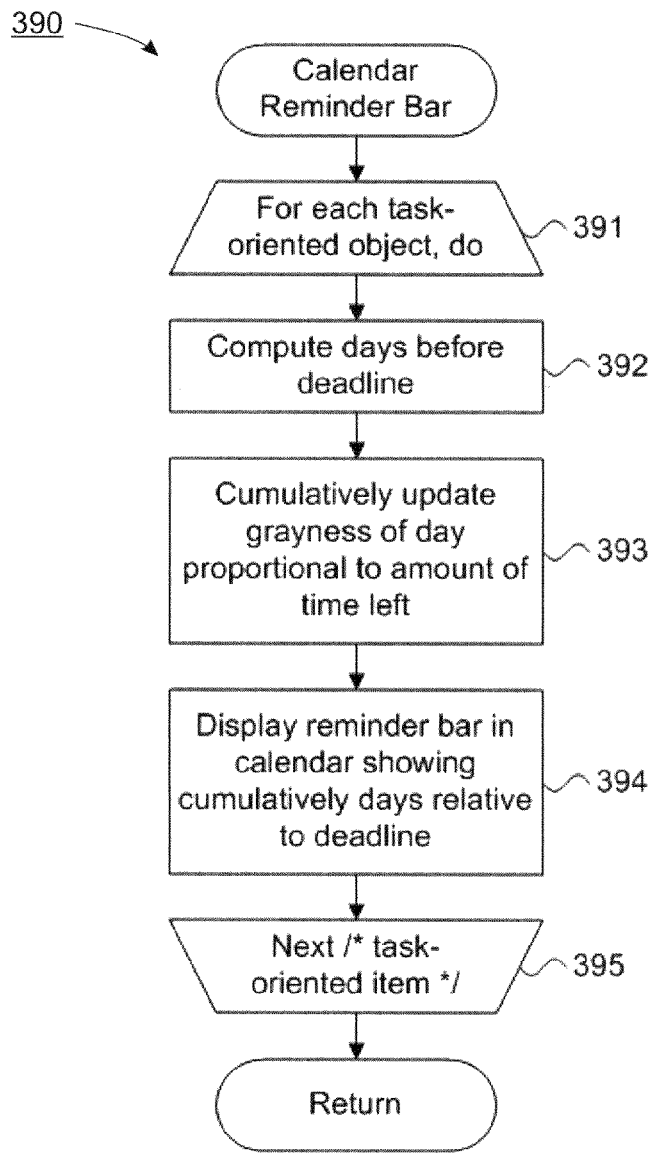
FIG. 30 is a flow diagram showing a routine for visualizing calendar reminder bars for use in the routine of FIG. 6.

FIG. 30 is a flow diagram showing a routine for visualizing calendar reminder bars 390 for use in the routine 200 of FIG. 6. One purpose of this routine is to present an aggregate visual representation of multiple reminders associated with one or more task-oriented items 139 in a calendar view.

For each task-oriented item 139 (block 391), the number of days occurring before a deadline associated with a task-oriented item 139 is computed (block 392). Individual days are displayed on the calendar, for instance, in progressively grayer squares as each deadline approaches. Thus, the grayness of each square in the calendar for those days prior to a deadline associated with each of the items is cumulatively updated proportionally to the amount of free time left (block 393). A reminder bar is then displayed in a calendar view showing the days relative to a deadline cumulatively grayed (block 394), as further described below with reference to FIG. 31. Processing continues with each remaining task-oriented item 139 (block 395), after which the routine returns.

Figure 31:
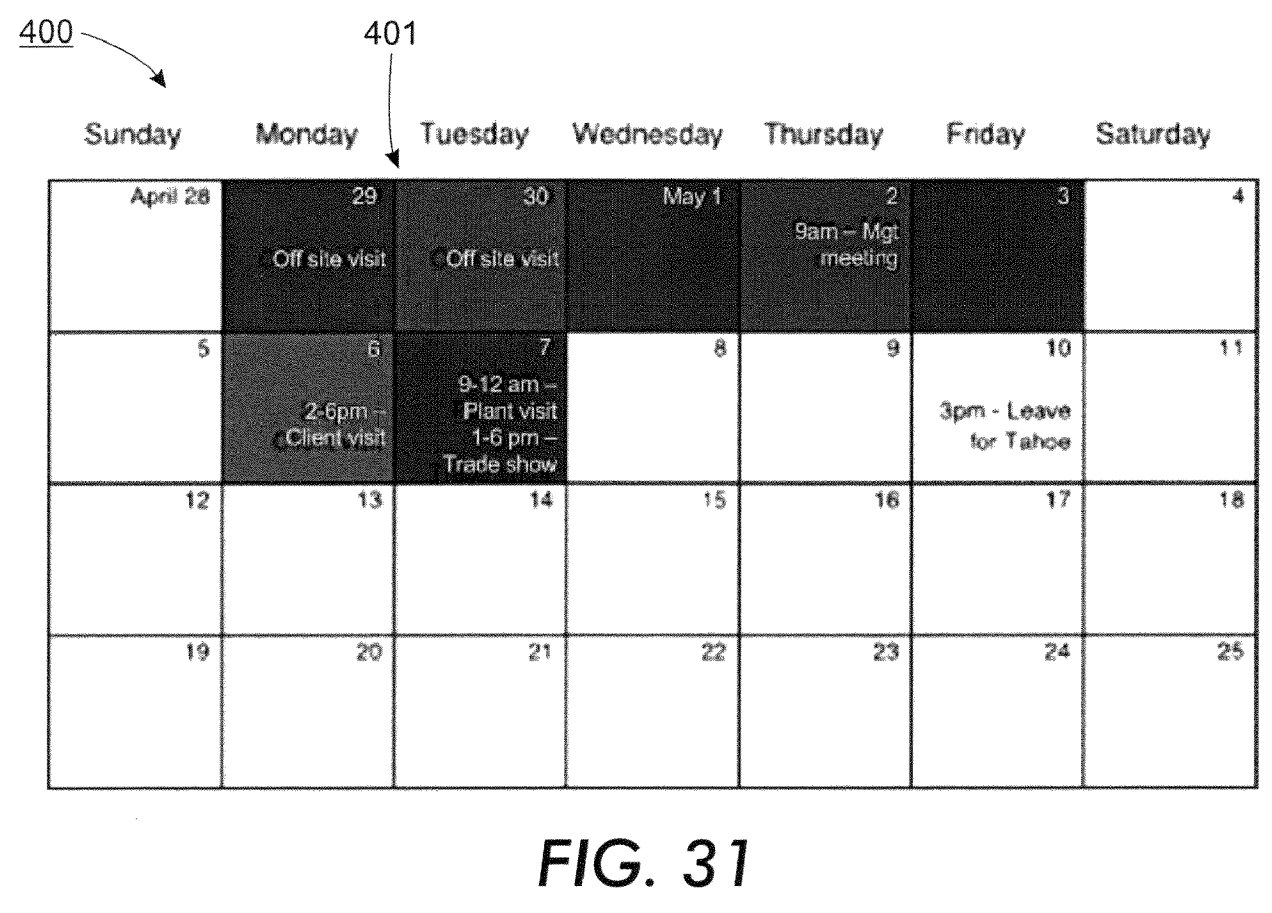

FIG. 31 is a screen display 400 showing, by way of example, calendar reminder bars 401 as visualized by the routine 390 of FIG. 30. The calendar reminder bars 401 provides a means for accessing the original task-oriented items 139. A set of reminder bars 401 are displayed for a plurality of items 139 to show the amount of free time for each day. Each reminder bar 401 is displayed in progressively darker shades of gray as the amount of time remaining prior to a deadline associated with each of the items decreases. Other forms, colors and arrangements of calendar reminder bars 401 are possible.

Gant Chart Visualization

Figure 32:
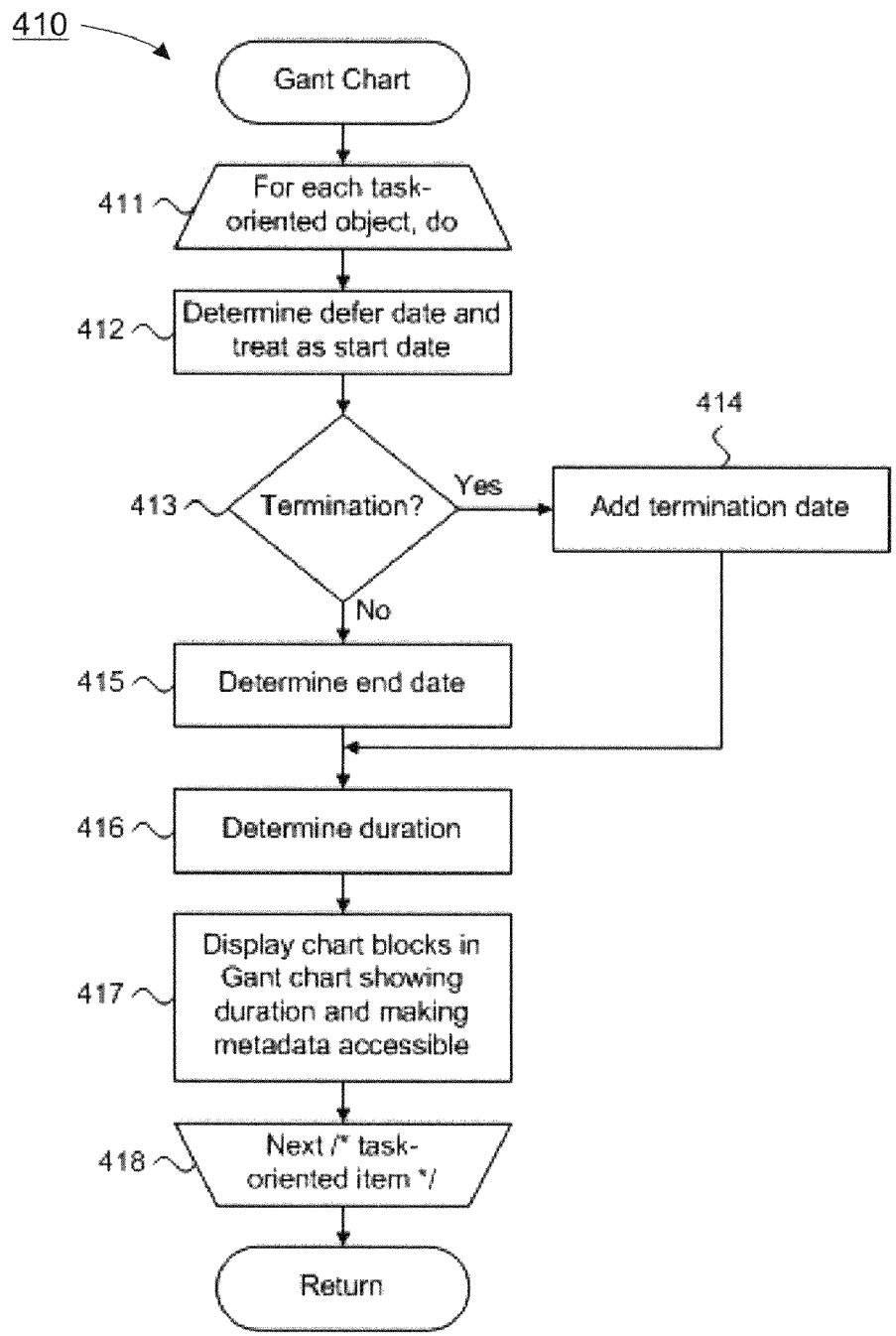
FIG. 32 is a flow diagram showing a routine for visualizing a Gant chart for use in the routine of FIG. 6.

FIG. 32 is a flow diagram showing a routine for visualizing a Gant chart 410 for use in the routine 200 of FIG. 6. One purpose of this routine is to present an aggregate visual representation of multiple coextensive activity performance time periods associated with one or more item-oriented items 139 in a Gant chart.

For each task-oriented item 139 (block 411), each defer date associated with a task-oriented item 139 is identified and treated as a start date (block 412). Optionally, a termination date can be added (block 414) if desired (block 413). However, a termination date need not be added if a termination is already available and can be determined (block 415). A duration is determined using either the termination date or termination (block 416). A chart block is generated and displayed in a Gant chart for the duration determined for each of the items and to make the metadata accessible 140 (block 417), as further described below with reference to FIG. 33. Processing continues with each remaining task-oriented item 139 (block 418), after which the routine returns.

Figure 33:
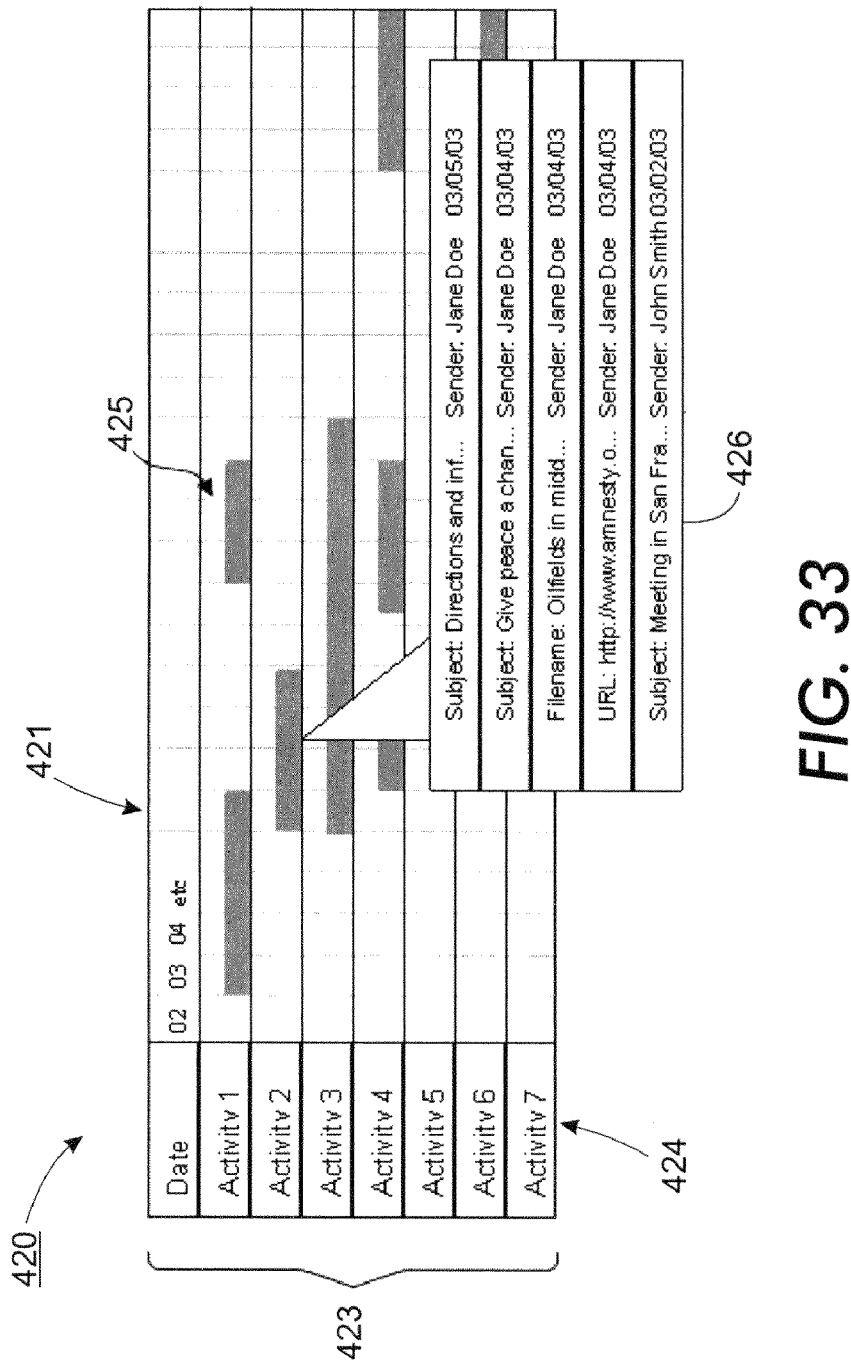
FIG. 33 is a screen display showing, by way of example, a Gant chart as visualized by the routine of FIG. 32.

FIG. 33 is a screen display 420 showing, by way of example, a Gant chart 421 as visualized by the routine 410 of FIG. 32. A set of chart blocks 425 are displayed for a plurality of task-oriented items 139. The chart blocks 425 provides a means for accessing the original items 139. A short description 424 of each task-oriented items 139 is also provided. Optionally, the chart blocks 425 can be ordered 423 in by start dates. Other forms, colors and arrangements of Gant charts 421 are possible In a further embodiment, an expanded box 426 shows the individual task-oriented items 139 to which the chart block 425 corresponds. The expanded box 426 provides a means for accessing the original items 139. Additionally, items could be added or modified by selecting into the expanded box 426. As well, the duration of each task-oriented items 139 could be adjusted by moving and resizing the corresponding chart block 425. Other forms, types and arrangements of expanded boxes 426 are possible.

Integrated Calendar Visualization

Figure 34:
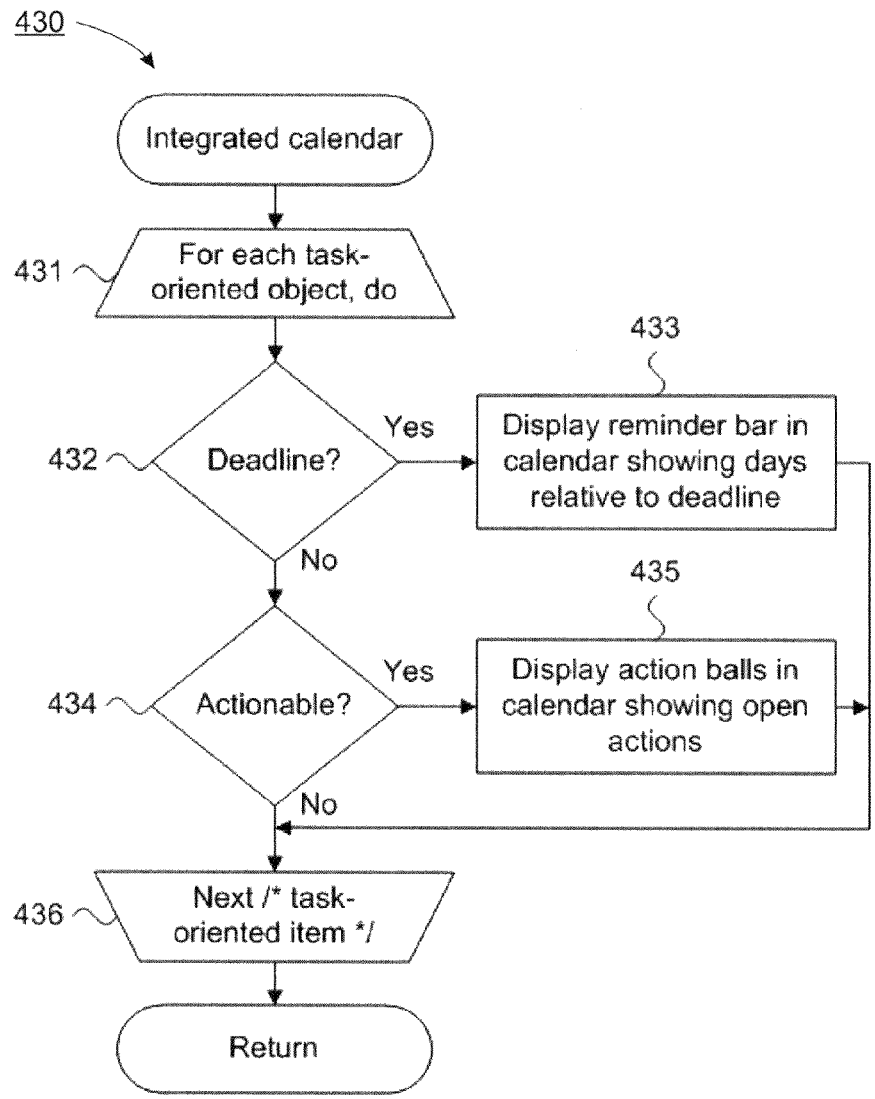
FIG. 34 is a flow diagram showing a routine for visualizing an integrated calendar for use in the routine of FIG. 6.

FIG. 34 is a flow diagram showing a routine for visualizing an integrated calendar 430 for use in the routine 200 of FIG. 6. One purpose of this routine is to present an aggregate visual representation of multiple reminders and actions associated with one or more task-oriented items 139 in an integrated calendar view.

For each task-oriented item 139 (block 431), each deadline and actionable item is identified (blocks 432 and 434, respectively). A reminder bar showing the days relative to each deadline and action balls showing open actions associated with a task-oriented item 139 are displayed in an integrated calendar (blocks 433 and 435, respectively), as further described below with reference to FIG. 35. Processing continues with each remaining task-oriented item 139 (block 436), after which the routine returns.

Figure 35:
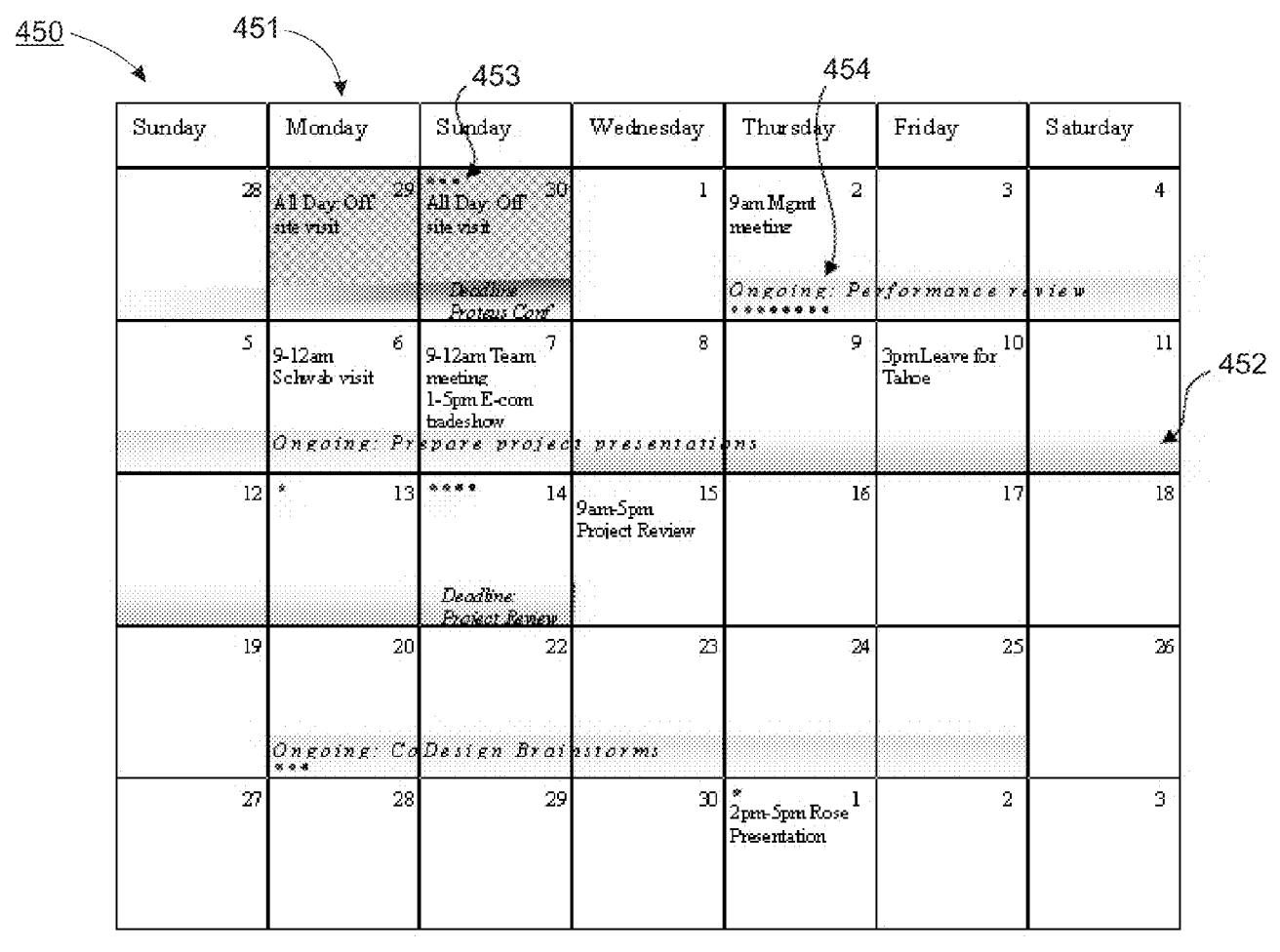

FIG. 35 is a screen display 450 showing, by way of example, an integrated calendar 451 as visualized by the routine 430 of FIG. 34. The integrated calendar 451 provides a means for accessing the original task-oriented items 139. A set of reminder bars 452 are displayed for a plurality of items 139. Similarly, a set of action balls 453 are displayed for a plurality of items 139. The reminder bars 452 visually display on-going items, which have a determinable duration and are indicated by task-related colors. When no determinable duration can be ascertained, such as when the item 139 has a deadline date but no starting date, the reminder bars 452 are indicated by a progressively darkening color towards the deadline date. Similarly, the action balls 453 visually display outstanding items and propagate to the next calendar day if left outstanding. As well, action balls 454 can be attached to on-going items 139. In a further embodiment, selecting on the representation presented in the integrated calendar 451 will recall a detailed view of the task-oriented items 139 to which the representation corresponds. Other forms, colors and arrangements of calendar reminder bars 451 are possible.

Spreadsheet Visualization

Figure 36:
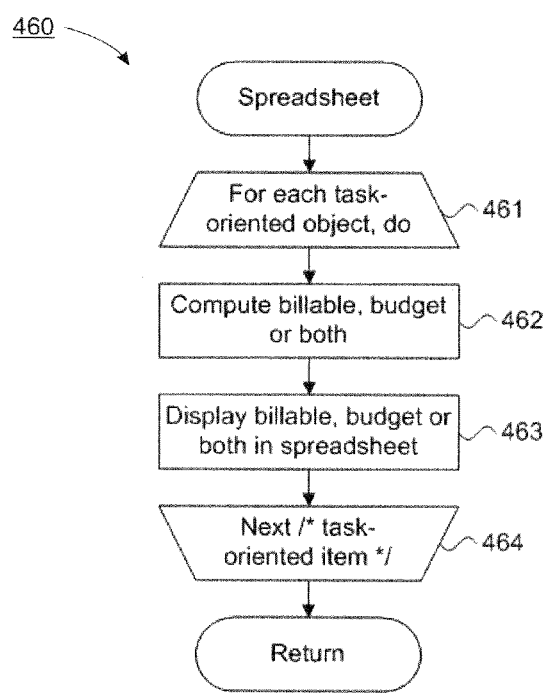
FIG. 36 is a flow diagram showing a routine for visualizing a spreadsheet for use in the routine of FIG. 6.

FIG. 36 is a flow diagram showing a routine for visualizing a spreadsheet 460 for use in the routine 200 of FIG. 6. One purpose of this routine is to present an aggregate visual representation of multiple billable or budget-related items associated with one or more task-oriented items 139 in a spreadsheet view. In addition, other types of numeric data associated with each task, such as work hours and the like, can be gathered and organized in a spreadsheet view.

For each task-oriented item 139 (block 461), either a billable or budget-related amount associated with a task-oriented item 139, or both, are computed (block 462) and displayed in a spreadsheet (block 470), as further described below with reference to FIG. 37. Processing continues with each remaining task-oriented item 139 (block 464), after which the routine returns.

FIG. 37 is a screen display 470 showing, by way of example, a spreadsheet 471 as visualized by the routine 460 of FIG. 36. The spreadsheet 471 provides a means for accessing the original task-oriented items 139. A set of amounts 474, such as billable or budget-related amounts, are displayed for a plurality of items 139. A short description 473 of each item 139 is also provided. Optionally, the items 139 can be ordered 472 in terms of any assigned properties indicated in the column headers. In a further embodiment, selecting an item 139 in the spreadsheet 471 will recall a detailed view. Other forms, compositions and arrangements of spreadsheet data are possible.

Contacts Viewer Visualization

Figure 38:
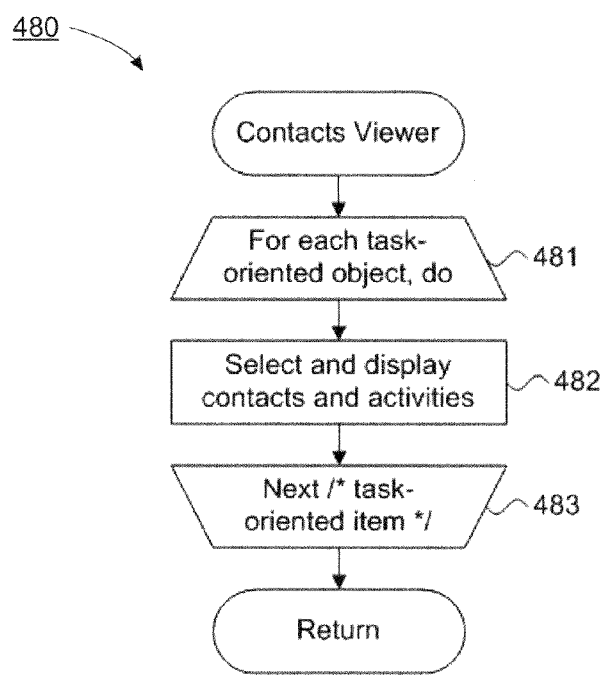
FIG. 38 is a flow diagram showing a routine for visualizing a contacts viewer for use in the routine of FIG. 6.

FIG. 38 is a flow diagram showing a routine for visualizing a contacts viewer 480 for use in the routine 200 of FIG. 6. One purpose of this routine is to present an aggregate visual representation of multiple contacts associated with one or more task-oriented items 139 in a contacts viewer.

For each task-oriented item 139 (block 481), each contact and task associated with a task-oriented item 139 is selected and displayed in a contacts viewer (block 482), as further described below with reference to FIG. 39. Processing continues with each remaining task-oriented item 139 (block 483), after which the routine returns.

Figure 39:
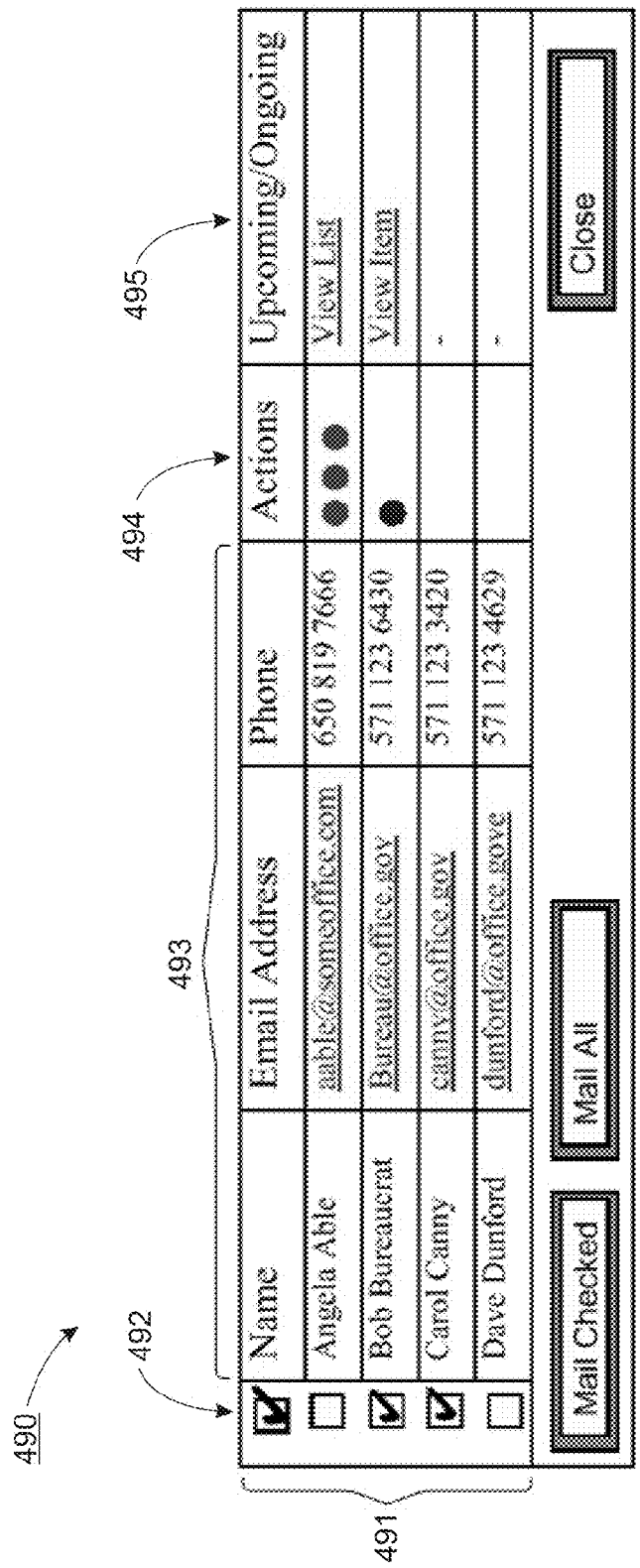
FIG. 39 is a screen display showing, by way of example, a contacts viewer as visualized by the routine of FIG. 38.

FIG. 39 is a screen display 490 showing, by way of example, a contacts viewer 491 as visualized by the routine 480 of FIG. 38. The contacts viewer 491 provides a means for accessing the original task-oriented items 139. Individual contacts 493 and actions 494 are displayed for a plurality of items 139. One or more of the contacts 493 can be selected for sending email 130 using a checkbox 492. Outstanding actions 494 can be annotated to each contact 493, either automatically inferred by the modeling logic 135 or manually by the user, and color-coded to indicate action status. Optionally, the items 139 can be ordered. In a further embodiment, selecting an item in the contacts viewer 491 will recall a detailed view of the task-oriented items 139 to which the item 139 corresponds. Other forms, compositions and arrangements of contacts viewing are possible.

While the application has been particularly shown and described as referenced to the embodiments thereof, those skilled in the art will understand that the foregoing and other changes in form and detail may be made therein without departing from the spirit and scope.

What is claimed is:

1. A system for providing dynamic interaction with task-oriented items in a task management framework, comprising:
   a display device;
   at least one template specifying a task comprising a visualization interface and one or more user interactive components, each of the one or more user interactive components associated with task-specific metadata expectations;
   modeling logic defining data processing expectations comprised of the task, associated with the template and operating on at least one task-oriented item comprising data of explicit information extrinsic to content of, and implicit qualities of, the at least one task-oriented item related to each of planning, execution and completion of the task;
   a task management interface comprising:
   a task viewer to instantiate the at least one template as a template instance for the task;
   identifying an association between the at least one task-oriented item and at least one user interactive component;
   a data extraction module to extract the data from the at least one task-oriented item matching the task-specific metadata expectations of the at least one user interactive component upon the identified association through at least one of dynamic extraction, based on the data processing expectations of the task, and user interactive mode, by which a user selects the data extracted and to store such extracted data as metadata associated with the at least one user interactive component;
   a tag module to tag the at least one task-oriented item with the matching metadata;
   a determination module to determine at least one action required to complete the task from the metadata;
   a visualization module to provide a visualization of the metadata through the visualization interface and to create a To-Do list comprised of the at least one action required to complete the task, comprising:
   an activity generation module to generate at least one other task-oriented item comprising the at least one action required, comprising:
   an execution module to execute the modeling logic;
   and a metadata application module to apply the metadata to the specific data processing expectations; and
   a presentation module to populate the To-Do list with the at least one other generated task-oriented item and to display the To-Do list in the visualization interface on the display device.

2. A system according to claim 1, further comprising:
   a task object to logically link the at least one task-oriented item to the at least one template instance.

3. A system according to claim 1, further comprising:
   processing logic to propagate an effect of the operation on the at least one task-oriented item to at least one other such task-oriented item.

4. A system according to claim 1, further comprising:
   at least one of a direct link or indirect causal inference to associate the modeling logic with the at least one task-oriented item.

5. A system according to claim 1, further comprising:
   a parser to parse an effect of the operation on the at least one task-oriented item, wherein the effect is assimilated into the at least one template instance.

6. A system according to claim 1, further comprising:
   a semantic analyzer to semantically analyze an effect of the operation on the at least one task-oriented item, wherein the effect is assimilated into the at least one template instance.

7. A system according to claim 1, further comprising:
   a visualization to visualize an effect of the operation on the at least one task-oriented item.

8. A system according to claim 1, further comprising:
   an evaluator to evaluate an effect of the operation on the at least one task-oriented item relative to a task-oriented item is selected from the group comprising email, an activity, an event, a contact, a task object, and application data.

9. A system according to claim 1, further comprising:
   metadata to associate with at least one such task-oriented item responsive to a selection of a user interactive component.

10. A system according to claim 1, further comprising:
    a log to track at least one user preference observed responsive to a selection of a user interactive component.

11. A system according to claim 10, further comprising:
    an evaluator to statistically evaluate the at least one user preference over a plurality of such selections.

12. A system according to claim 1, wherein the task-oriented item is selected from the group comprising email, an activity, an event, a contact, a task object, and application data.

13. A system according to claim 12, further comprising:
    a resource viewer to access at least one such task-oriented item responsive to a selection of a user interactive component.

14. A system according to claim 12, wherein the task object comprises a collection of one or more task-oriented items.

15. A system according to claim 1, wherein the user interactive component is selected from the group comprising an icon and a hotspot.

16. A system according to claim 1, wherein the task management framework comprises one or more components selected from the group comprising a task viewer, an email client, an activity manager, an event manager, a contact manager, and an application.

17. A method for providing dynamic interaction with task-oriented items in a task management framework, comprising:
    specifying a task and defining data processing expectations comprised with the task;
    identifying at least one task-oriented item comprising data of explicit information extrinsic to content of, and implicit qualities of, the at least one task-oriented item related to each of planning, execution and completion of the task;
    defining at least one template for the task comprising a visualization interface and one or more user interactive components, each of the one or more user interactive components associated with task-specific metadata expectations;
    associating modeling logic specific to the data processing with the at least one template;
    instantiating the at least one template as a template instance for the task;
    identifying an association between the at least one task-oriented item and at least one user interactive component;
    extracting the data from the at least one task-oriented item matching the task-specific metadata expectations of the at least one user interactive component upon the identified association through at least one of dynamic extraction, based on the data processing expectations of the task, and user interactive mode, by which a user selects the data extracted;
storing such extracted data as metadata associated with the at least one user interactive component;
tagging the at least one task-oriented item with the matching metadata;
determining at least one action required to complete the task from the metadata;
creating a To-Do list comprised of the at least one action required to complete the task, comprising:
providing a visualization of the metadata through the visualization interface;
generating at least one other task-oriented item comprising the at least one action required, comprising:
executing the modeling logic; and
applying the metadata to the specific data processing expectations;
populating the To-Do list with the at least one other generated task-oriented item; and
displaying the To-Do list in the visualization interface.

18. A method according to claim 17, further comprising:
logically linking the at least one task-oriented item to the at least one template instance.

19. A method according to claim 17, further comprising:
propagating an effect of the operation on the at least one task-oriented item to at least one other such task-oriented item.

20. A method according to claim 17, further comprising:
associating the modeling logic with the at least one task-oriented item through at least one of a direct link or indirect causal inference.

21. A method according to claim 17, further comprising:
parsing an effect of the operation on the at least one task-oriented item; and
assimilating the effect into the at least one template instance.

22. A method according to claim 17, further comprising:
semantically analyzing an effect of the operation on the at least one task-oriented item; and
assimilating the effect into the at least one template instance.

23. A method according to claim 17, further comprising:
visualizing an effect of the operation on the at least one task-oriented item.

24. A method according to claim 17, further comprising:
evaluating an effect of the operation on the at least one task-oriented item relative to a task-oriented item selected from the group comprising email, an activity, an event, a contact, a task object, and application data.

25. A method according to claim 17, further comprising:
associating metadata with at least one such task-oriented item responsive to a selection of a user interactive component.

26. A method according to claim 17, further comprising:
tracking at least one user preference observed responsive to a selection of a user interactive component.

27. A method according to claim 26, further comprising:
statistically evaluating the at least one user preference over a plurality of such selections.

28. A method according to claim 17, wherein the task-oriented item is selected from the group comprising email, an activity, an event, a contact, a task object, and application data.

29. A method according to claim 28, further comprising:
accessing at least one such task-oriented item responsive to a selection of a user interactive component.

30. A method according to claim 28, wherein the task object comprises a collection of one or more task-oriented items.

31. A method according to claim 17, wherein the user interactive component is selected from the group comprising an icon and a hotspot.

32. A method according to claim 17, wherein the task management framework comprises one or more components selected from the group comprising a task viewer, an email client, an activity manager, an event manager, a contact manager, and an application.

33. An apparatus for providing dynamic interaction with task-oriented items in a task management framework, comprising:
a processor;
means for specifying a task and defining data processing expectations comprised with the task;
means for identifying at least one task-oriented item comprising data of explicit information extrinsic to content of, and implicit qualities of, the at least one task-oriented item related to each of planning, execution and completion of the task;
means for defining at least one template for the task comprising a visualization interface and one or more user interactive components, each of the one or more user interactive components associated with task-specific metadata expectations;
means for associating modeling logic specific to the data processing expectations with the at least one template;
means for instantiating the at least one template as a template instance for the task;
means for identifying an association between the at least one task-oriented item and at least one user interactive component;
means for extracting the data from the at least one task-oriented item matching the task-specific metadata expectations of the at least one user interactive component upon the identified association through at least one of dynamic extraction, based on the data processing expectations of the task, and user interactive mode, by which a user selects the data extracted;
means for storing such extracted data as metadata associated with the at least one user interactive component;
means for tagging the at least one task-oriented item with the matching metadata;
means for determining at least one action required to complete the task from the metadata;
means for creating a To-Do list comprised of the at least one action required to complete the task, comprising:
means for providing a visualization of the metadata through the visualization interface;
means for generating at least one other task-oriented item comprising the at least one action required, comprising:
executing the modeling logic; and
applying the metadata to the specific data processing expectations;
means for populating the To-Do list with the at least one other generated task-oriented item; and
means for displaying the To-Do list in the visualization interface.

* * * * *